United States Patent
Suzuki et al.

(10) Patent No.: US 8,922,831 B2
(45) Date of Patent: Dec. 30, 2014

(54) IMAGE CAPTURING DEVICE, COLOR MEASURING DEVICE, COLOR MEASURING SYSTEM, AND IMAGE FORMING APPARATUS

(71) Applicants: Hideaki Suzuki, Kanagawa (JP); Kazushi Takei, Tokyo (JP); Satoshi Iwanami, Kanagawa (JP); Masahiro Shigemoto, Saitama (JP); Nobuyuki Satoh, Kanagawa (JP)

(72) Inventors: Hideaki Suzuki, Kanagawa (JP); Kazushi Takei, Tokyo (JP); Satoshi Iwanami, Kanagawa (JP); Masahiro Shigemoto, Saitama (JP); Nobuyuki Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 91 days.

(21) Appl. No.: 13/852,371

(22) Filed: Mar. 28, 2013

(65) Prior Publication Data
US 2013/0258369 A1  Oct. 3, 2013

(30) Foreign Application Priority Data
Mar. 28, 2012  (JP) .................................. 2012-075018

(51) Int. Cl.
| | | |
|---|---|---|
| *G06F 15/00* | (2006.01) | |
| *G06K 1/00* | (2006.01) | |
| *G06K 15/02* | (2006.01) | |
| *H04N 1/409* | (2006.01) | |
| *H04N 1/60* | (2006.01) | |

(52) U.S. Cl.
CPC ............ *G06K 15/027* (2013.01); *H04N 1/4097* (2013.01); *H04N 1/6033* (2013.01)
USPC .......................................................... 358/1.9

(58) Field of Classification Search
None
See application file for complete search history.

(56) References Cited

U.S. PATENT DOCUMENTS

| | | | |
|---|---|---|---|
| 8,218,035 B2 * | 7/2012 | Gyotoku ....................... | 348/241 |
| 2004/0037457 A1 * | 2/2004 | Wengender et al. .......... | 382/141 |
| 2005/0280867 A1 * | 12/2005 | Arai ............................... | 358/2.1 |
| 2012/0069411 A1 | 3/2012 | Satoh et al. | |
| 2013/0027720 A1 | 1/2013 | Satoh | |
| 2013/0027721 A1 | 1/2013 | Kobayashi et al. | |

FOREIGN PATENT DOCUMENTS

| | | |
|---|---|---|
| JP | 3013213 | 12/1999 |
| JP | 3129502 | 11/2000 |

* cited by examiner

*Primary Examiner* — Mark Zimmerman
*Assistant Examiner* — Michael Burleson
(74) *Attorney, Agent, or Firm* — Oblon, Spivak, McClelland, Maier & Neustadt, L.L.P.

(57) ABSTRACT

An image capturing device includes an image capturing unit, a moving unit, a detector, and a determiner. The image capturing unit includes an optical transmission member; and a sensor capturing an image of the subject via the optical transmission member. The moving unit moves the image capturing unit in an optical axis direction of the sensor. The detector detects a contamination from first and second images. The first and second images are captured by the sensor when the image capturing unit is located at first and second positions in the optical axis direction, respectively. The second position is spaced away from the subject than the first position in the optical axis direction. The determiner determines that a contamination is deposited on the optical transmission member when a difference in the number of pixels in which a contamination is detected between the first and second images is less than a threshold.

19 Claims, 33 Drawing Sheets

| PATCH NUMBER | INITIAL REFERENCE RGB VALUES (RdGdBd) ||| Ld | ad | bd | Xd | Yd | Zd |
|---|---|---|---|---|---|---|---|---|---|
| | Rd | Gd | Bd | | | | | | |
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

Tb1

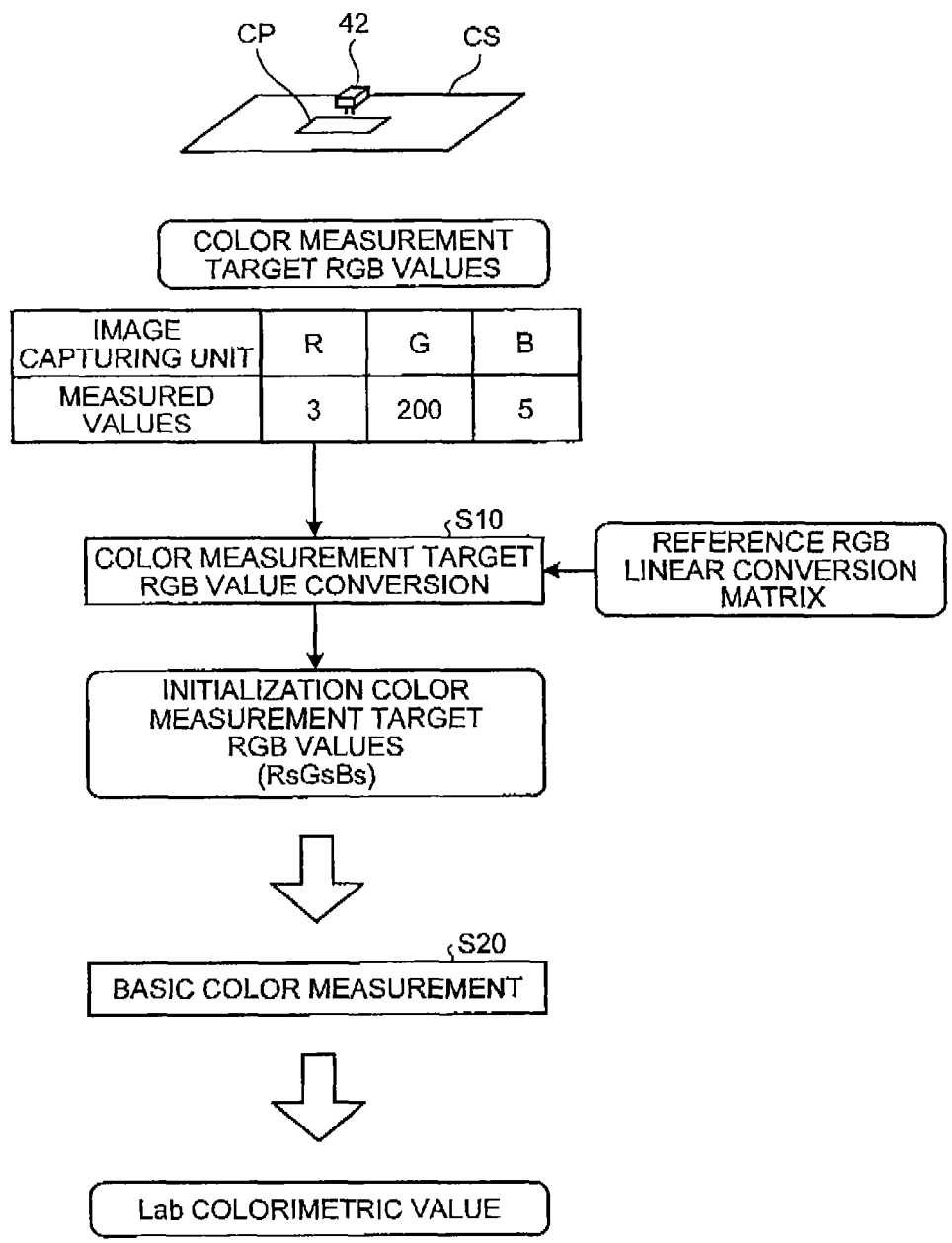

IMAGE CAPTURING DEVICE, COLOR MEASURING DEVICE, COLOR MEASURING SYSTEM, AND IMAGE FORMING APPARATUS

CROSS-REFERENCE TO RELATED APPLICATIONS

The present application claims priority to and incorporates by reference the entire contents of Japanese Patent Application No. 2012-075018 filed in Japan on Mar. 28, 2012.

BACKGROUND OF THE INVENTION

1. Field of the Invention

The present invention relates to an image capturing device, a color measuring device, a color measuring system, and an image forming apparatus.

2. Description of the Related Art

In image forming apparatuses, such as printers, processing called color management is performed in order to enhance reproducibility of an output relative to an input by reducing fluctuations in the output caused by characteristics unique to each individual device. The color management may, for example, be performed by the following techniques. Specifically, an image of a color chart of a reference color (patch) is actually output using the image forming apparatus (the patch output as an image by the image forming apparatus will hereinafter be referred to as a "color measurement target patch") and the color measurement target patch is then subjected to color measurement using a color measuring device. A color conversion parameter is then generated based on a difference between a calorimetric value obtained from the color measurement target patch and a color specification value of the reference color corresponding thereto in a standard color space. The color conversion parameter is then set in the image forming apparatus. When thereafter outputting an image according to image data input thereto, the image forming apparatus subjects the input image data to color conversion based on the set color conversion parameter and outputs an image based on image data after the color conversion. The image forming apparatus can thereby output an image with high reproducibility and with reduced fluctuations in the output caused by characteristics unique to each individual device.

In such color management, spectrophotometers are widely used as the color measuring device performing color measurement of the color measurement target patch. The spectrophotometer provides a spectral reflection factor for each wavelength and is thus capable of performing color measurement with high accuracy. The spectrophotometer is, however, an expensive instrument having a large number of sensors mounted therein and a need thus exists for color measurement with high accuracy using a lower cost instrument.

Exemplary methods for achieving color measurement at low cost include use of an image capturing device that includes an image sensor, the image capturing device capturing an image the color measurement target as a subject and an RGB value of the subject obtained by the image capturing being converted to a color specification value in the standard color space. For example, Japanese Patent No. 3129502 discloses a technique in which a reference color chart is placed near a subject that serves as the color measurement target, a reference color chart serving for comparison with the subject, the subject and the reference color chart are simultaneously imaged with a color video camera, and RGB data of the reference color chart to be obtained through the image capturing is used to correct RGB data of the subject before the RGB data of the subject being converted to a color specification value in the standard color space.

With the technique disclosed in Japanese patent No. 3129502, however, it is difficult to maintain a positional relation among the subject, a light source, and the color video camera, which results in image capturing conditions being varied, so that image capturing cannot be performed stably.

Therefore, there is a need for an image capturing device, a color measuring device, a color measuring system, and an image forming apparatus capable of performing stable image capturing.

SUMMARY OF THE INVENTION

According to an embodiment, there is provided an image capturing device that includes an image capturing unit, a moving unit, a detector, and a determining unit. The image capturing unit includes an optical transmission member disposed on a surface facing a subject; and a sensor unit that captures an image of the subject via the optical transmission member. The moving unit moves the image capturing unit in an optical axis direction of the sensor unit. The detector detects a contamination from both of a first image and a second image. The first image is captured by the sensor unit when the image capturing unit is located at a first position in the optical axis direction, and the second image is captured by the sensor unit when the image capturing unit is located at a second position spaced farther away from the subject than the first position in the optical axis direction. The determining unit determines that a contamination is deposited on the optical transmission member when a difference in the number of pixels in which a contamination is detected between the first image and the second image is less than a first threshold.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram illustrating an outline of a color measurement process;

DETAILED DESCRIPTION OF THE PREFERRED EMBODIMENTS

Preferred embodiments of an image capturing device, a color measuring device, a color measurement system, and an image forming apparatus according to the present invention are described below in greater detail with reference to the accompanying drawings. In the embodiments described below, an inkjet printer is used as an example of an image forming apparatus to which the present invention is applied. However, the present invention is widely applicable to various types of image forming apparatuses that output an image to a recording medium.

Mechanical Configuration of the Image Forming Apparatus

Figure 1:
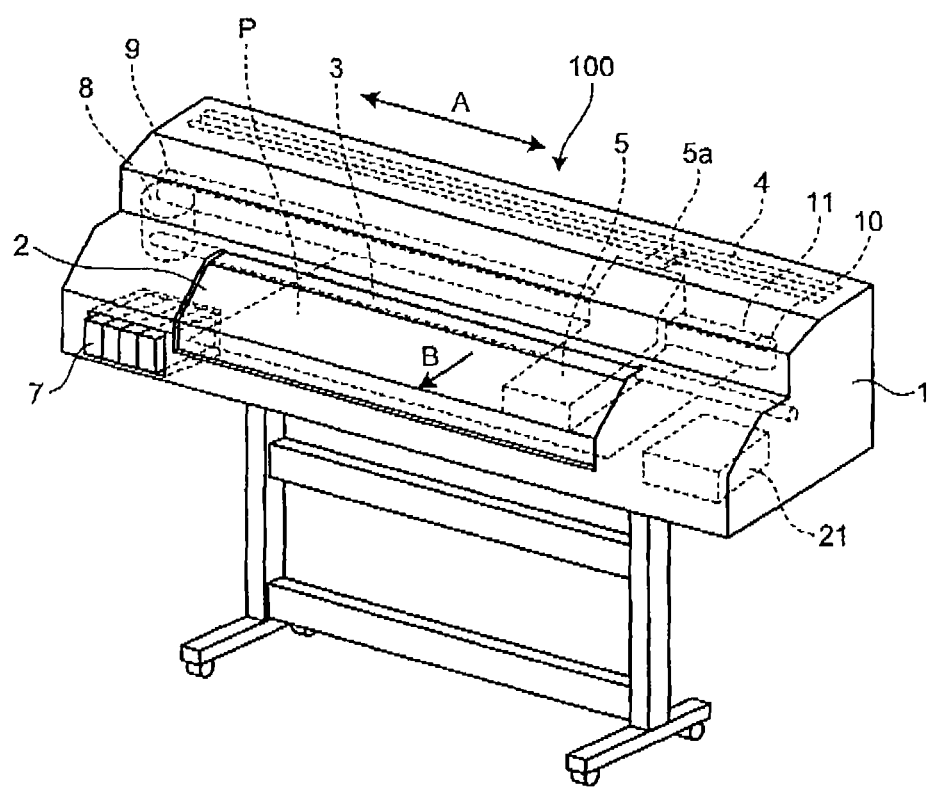
FIG. 1 is a perspective view illustrating the inside of an image forming apparatus in a see-through manner.
Figure 2:
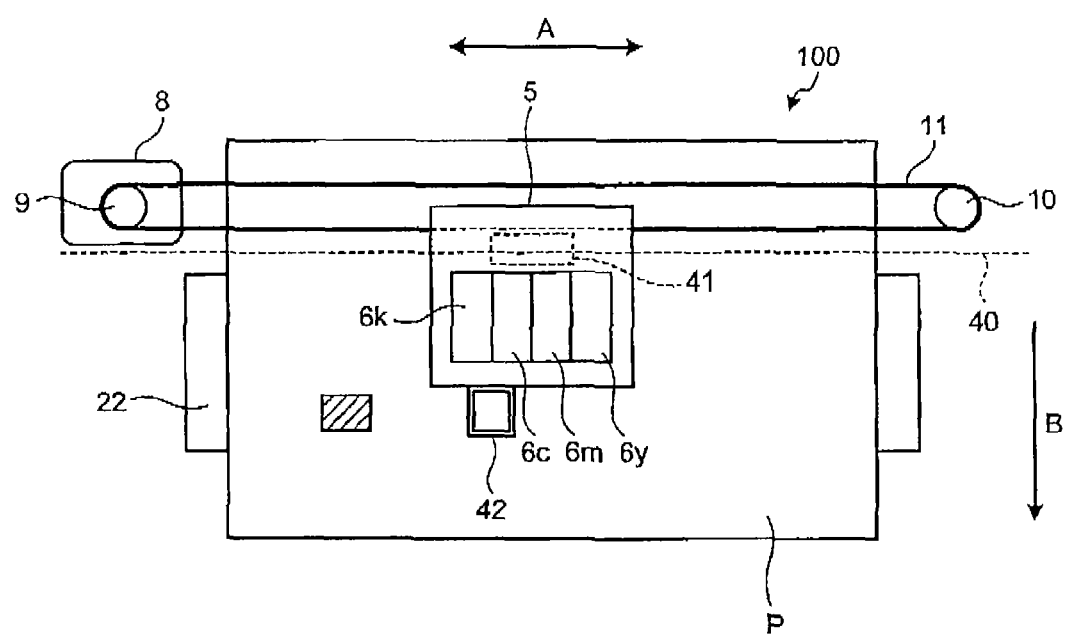
FIG. 2 is a top view illustrating a mechanical configuration of the inside of the image forming apparatus.
Figure 3:
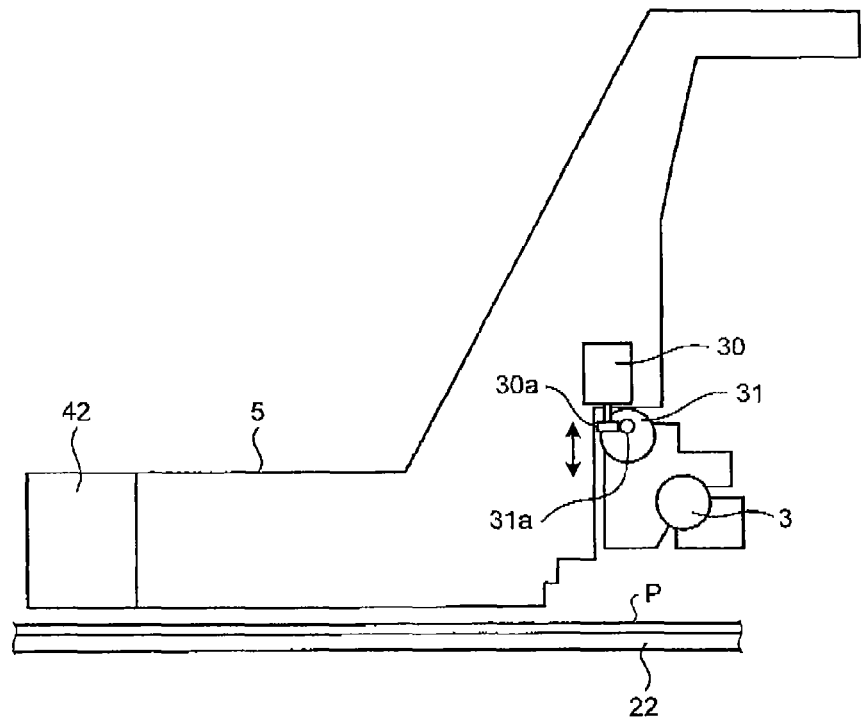
FIG. 3 is an exemplary view illustrating an elevating mechanism that raises or lowers a carriage.
Figure 4:
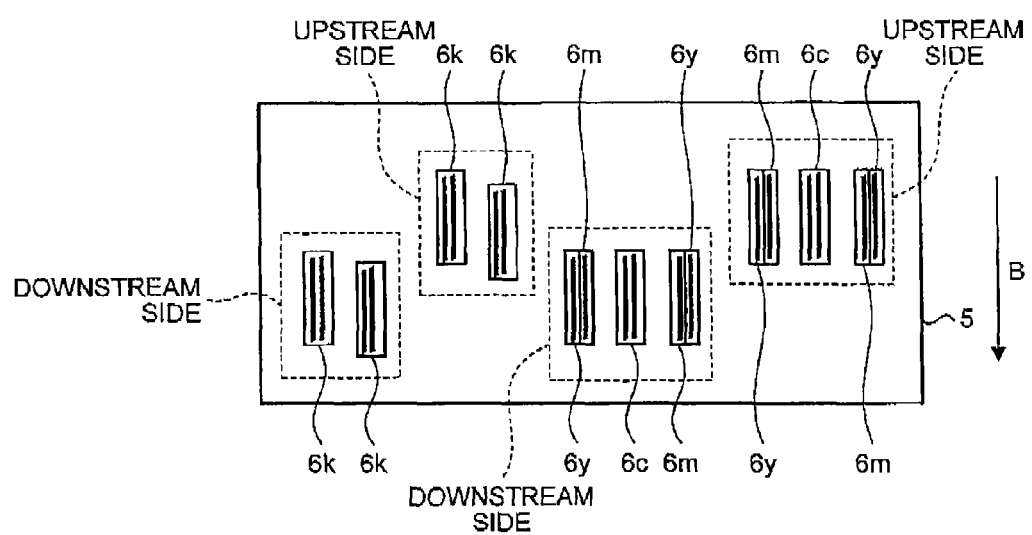
FIG. 4 is an exemplary view for illustrating an arrangement of a print head mounted on the carriage.

A mechanical configuration of this image forming apparatus 100 according to an embodiment of the present embodiment will be described with reference to FIGS. 1 to 4. FIG. 1 is a perspective view illustrating the inside of the image forming apparatus 100 in a see-through manner. FIG. 2 is a top view illustrating a mechanical configuration of the inside of the image forming apparatus 100. FIG. 3 is an exemplary view illustrating an elevating mechanism that raises or lowers a carriage 5. FIG. 4 is an exemplary view for illustrating an arrangement of a print head 6 mounted on the carriage 5.

As illustrated in FIG. 1, the image forming apparatus 100 according to the present embodiment includes the carriage 5. The carriage 5 reciprocates in a main-scanning direction (direction of arrow A in FIG. 1), thereby forming an image on a recording medium P conveyed intermittently in a sub-scanning direction (direction of arrow B in FIG. 1). The carriage 5 is supported by a main guide rod 3 extending along the main-scanning direction. The carriage 5 is provided with a connection piece 5a. The connection piece 5a engages with a sub guide member 4 arranged in parallel with the main guide rod 3, and stabilizes the position of the carriage 5.

As illustrated in FIG. 2, the carriage 5 includes a print head 6y that ejects yellow (Y) ink, a print head 6m that ejects magenta (M) ink, a print head 6c that ejects cyan (C) ink, and a plurality of print heads 6k that eject black (Bk) ink (hereinafter, if the print heads 6y, 6m, 6c, and 6k are called collectively, the print heads are referred to as a print head 6). The print head 6 is mounted on the carriage 5 with an ejection surface (nozzle surface) facing downward (toward the recording medium P).

A cartridge 7 is an ink supplier for supplying ink to the print head 6. The cartridge 7 is not mounted on the carriage 5, but is arranged at a predetermined position in the image forming apparatus 100. The cartridge 7 and the print head 6 are connected by a pipe, which is not illustrated, and the cartridge 7 supplies ink to the print head 6 through the pipe.

The carriage 5 is connected to a timing belt 11 stretched across a driving pulley 9 and a driven pulley 10. The driving pulley 9 rotates by drive of a main-scanning motor 8. The driven pulley 10 has a mechanism for adjusting the distance between the driving pulley 9 and the driven pulley 10, and has a function to apply predetermined tension to the timing belt 11. The drive of the main-scanning motor 8 moves the timing belt 11, thereby causing the carriage 5 to reciprocate in the main-scanning direction. As illustrated in FIG. 2, for example, the movement of the carriage 5 in the main-scanning direction is controlled based on an encoder value. The encoder value is obtained by an encoder sensor 41 provided to the carriage 5 detecting a mark of an encoder sheet 40.

The image forming apparatus 100 according to the present embodiment includes a maintenance mechanism 21 for maintaining reliability of the print head 6. The maintenance mechanism 21 performs cleaning and capping for the ejection surface of the print head 6, ejection of unnecessary ink from the print head 6, and other operations.

As illustrated in FIG. 2, a platen 22 is arranged at a position facing the ejection surface of the print head 6. The platen 22 supports the recording medium P when the print head 6 ejects ink on the recording medium P. The image forming apparatus 100 according to the present embodiment is a wide apparatus in which the carriage 5 moves for a long distance in the main-scanning direction. Therefore, the platen 22 is formed of a plurality of plate members joined in the main-scanning direction (direction of movement of the carriage 5). The recording medium P is nipped by carriage rollers driven by a sub-scanning motor, which is not illustrated, and is conveyed intermittently in the sub-scanning direction on the platen 22.

The recording medium P, if it is paper having a high stiffness or fanfold paper, may lift off the platen 22 during its conveyance. If the recording medium P contacts the ejection surface of the print head 6 at this time, the print head 6 may be damaged. As a solution to the recording medium P tending to lift off the platen 22, the image forming apparatus 100 includes an elevating mechanism that raises or lowers the carriage 5. If a type of recording medium P that tends to lift is to be used, a greater distance can be achieved between the recording medium P and the ejection surface of the print head 6. It is noted that the carriage 5 is raised or lowered through the movement of the carriage 5 being spaced away from, or brought closer to, the recording medium P.

As illustrated, for example, in FIG. 3, the elevating mechanism may include a carriage elevating motor 30 that displaces an eccentric cam 31 to thereby raise or lower the carriage 5. Specifically, the rotation of the carriage elevating motor 30 causes a gear 30a mounted on a rotating shaft of the carriage elevating motor 30 to rotate a shaft 31a of the eccentric cam 31. Since the shaft 31a is offset relative to the center of the eccentric cam 31, the rotation of the shaft 31a displaces the eccentric cam 31. The carriage 5, being in abutment with the eccentric cam 31, is moved in the direction of the arrow in FIG. 3 according as the eccentric cam 31 is displaced. The elevating mechanism illustrated in FIG. 3 is only an example and may be configured in any other manner as long as the elevating mechanism can achieve the function of raising and lowering the carriage 5.

The print head 6 includes a plurality of nozzle arrays. The print head 6 ejects ink from the nozzle arrays on the recording medium P conveyed on the platen 22, thereby forming an image on the recording medium P. In the present embodiment, to ensure a large width of an image that can formed on the recording medium P in one scanning of the carriage 5, the print heads 6 located upstream and the print heads 6 located downstream are mounted on the carriage 5 as illustrated in FIG. 4. Furthermore, the print heads 6k that eject black ink are mounted on the carriage 5 twice as many as the print heads 6y, 6m, and 6c that eject color ink. Furthermore, the print heads 6y and 6m are arranged side by side in a manner separated from each other. This configuration is employed for keeping order of colors superimposed during the reciprocation of the carriage 5 so as not to change the order of colors between the forward movement and the backward movement. The arrangement of the print head 6 illustrated in FIG. 4 is just an example, and the arrangement of the print head 6 is not limited thereto.

The components described above constituting the image forming apparatus 100 according to the present embodiment are arranged inside of an exterior body 1. The exterior body 1 is provided with a cover member 2 in an openable and closable manner. When maintenance of the image forming apparatus 100 is being done, or when a jam occurs, the cover member 2 is opened, making it possible to perform operations on the components arranged inside of the exterior body 1.

The image forming apparatus 100 according to the present embodiment conveys the recording medium P intermittently in the sub-scanning direction. The image forming apparatus 100 also causes the carriage 5 to move in the main-scanning direction while the conveyance of the recording medium P in the sub-scanning direction is stopped. At the same time, the image forming apparatus 100 ejects ink on the recording medium P placed on the platen 22 from the nozzle arrays of the print head 6 mounted on the carriage 5, thereby forming an image on the recording medium P.

In particular, during color adjustments for adjusting a color reproduction characteristic of the image forming apparatus 100, ink is ejected on the recording medium P to thereby form a color measurement target patch CP. The color measurement target patch CP is an image obtained by the image forming apparatus 100 actually outputting a patch of a reference color. The color measurement target patch CP represents an output characteristic of the image forming apparatus 100. The image forming apparatus 100 can therefore output an image with high reproducibility, if a color conversion parameter is generated based on a calorimetric value of the color measurement target patch CP and the image is output based on image data after color conversion using the color conversion parameter.

The image forming apparatus 100 according to the present embodiment includes a color measuring device for performing color measurement of the color measurement target patch CP. The color measuring device includes an image capturing unit 42 that images a subject together with a reference chart KC to be described later. As illustrated in FIGS. 2 and 3, the image capturing unit 42 is fixed to the carriage 5 and reciprocates in the main-scanning direction integrally with the carriage 5. In addition, as the carriage 5 is raised or lowered by the elevating mechanism, the image capturing unit 42 is similarly raised or lowered. The reference chart KC for use as a reference for a shade of color in which an image capturing condition during image capturing by the image capturing unit 42 is incorporated is integrated with the image capturing unit 42. As the carriage 5 moves, the image capturing unit 42 is moved to a position at which to face the subject. The image capturing unit 42 at this position then captures the images of the subject and the reference chart KC simultaneously. Simultaneous capturing of the images here means acquiring image data of one frame including the subject and the reference chart KC. Specifically, even if there is a time difference in acquisition of data for each pixel, the images of the subject and the reference chart KC are considered to be captured simultaneously as long as the image data including the subject and the reference chart KC in one frame is acquired.

During the color adjustments of the image forming apparatus 100, the recording medium P on which the color measurement target patch CP is formed is placed on the platen 22. The image capturing unit 42 is moved to the position at which to face the color measurement target patch CP through conveyance of an adjustment sheet CS and the movement of the carriage 5 by the sub-scanning motor. Under the foregoing condition, the image capturing unit 42 simultaneously captures the images of the color measurement target patch CP and the reference chart KC. By using the image data of the color measurement target patch CP and the reference chart KC obtained through the capturing of the image of the color measurement target patch CP as the subject by the image capturing unit 42, and by using a method to be described later, the color measuring device calculates the colorimetric value of the color measurement target patch CP.

Specific Example of the Image Capturing Unit

Figure 5A:
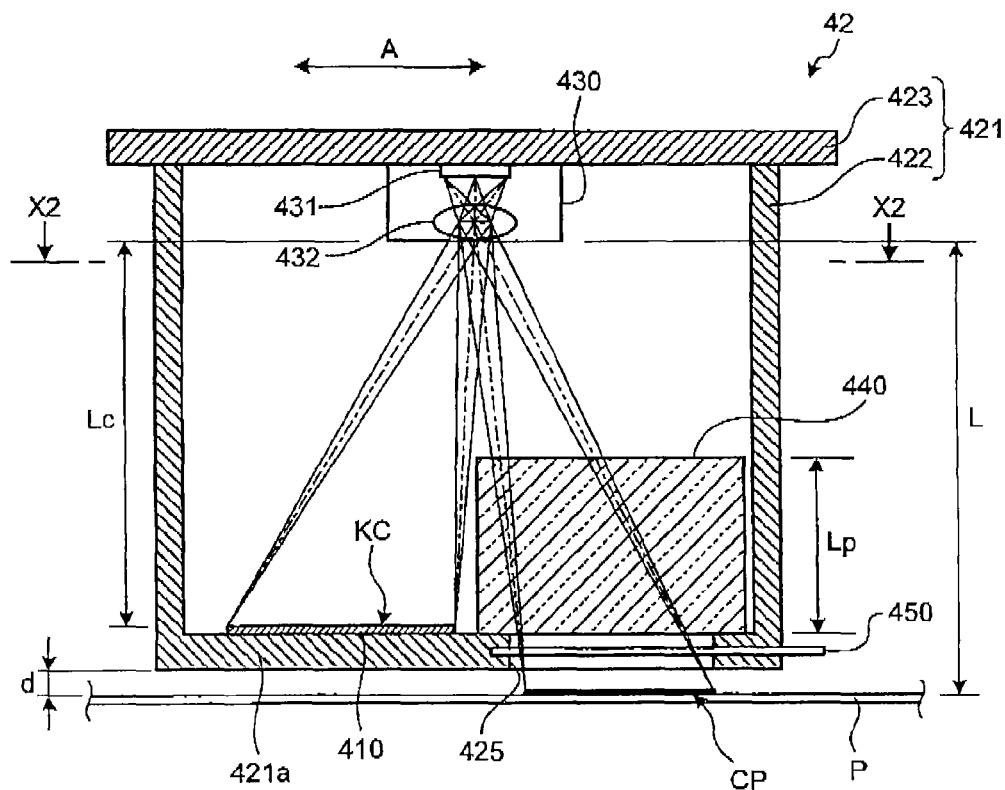
FIG. 5A is a longitudinal cross-sectional view (taken along line X1-X1 in FIG. 5B) of an image capturing unit.
Figure 5B:
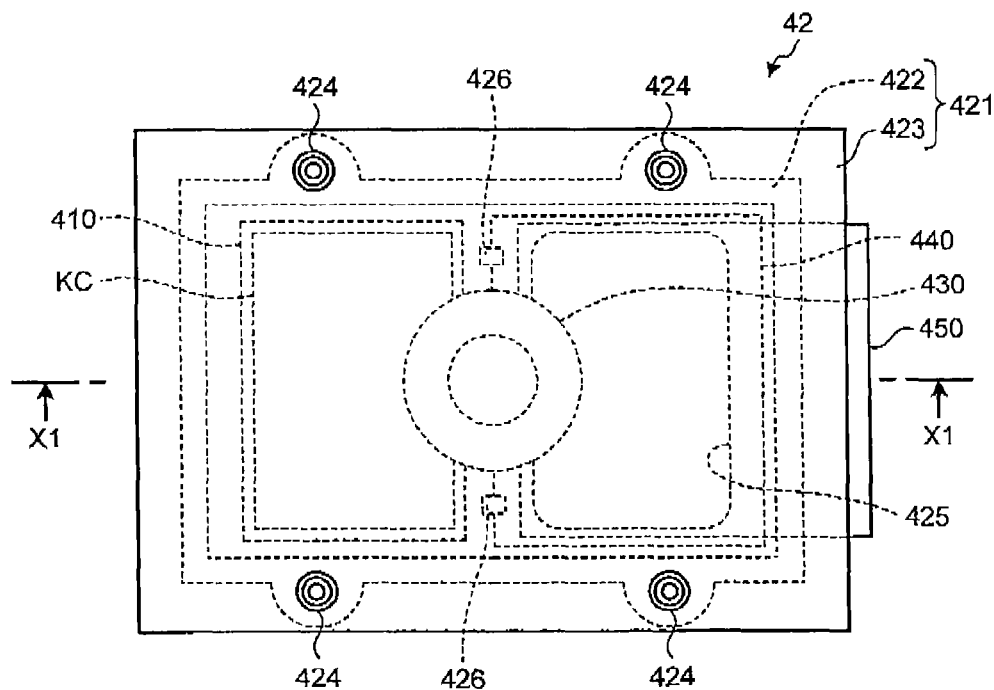
FIG. 5B is a top view illustrating the inside of the image capturing unit in a see-through manner.
Figure 5C:
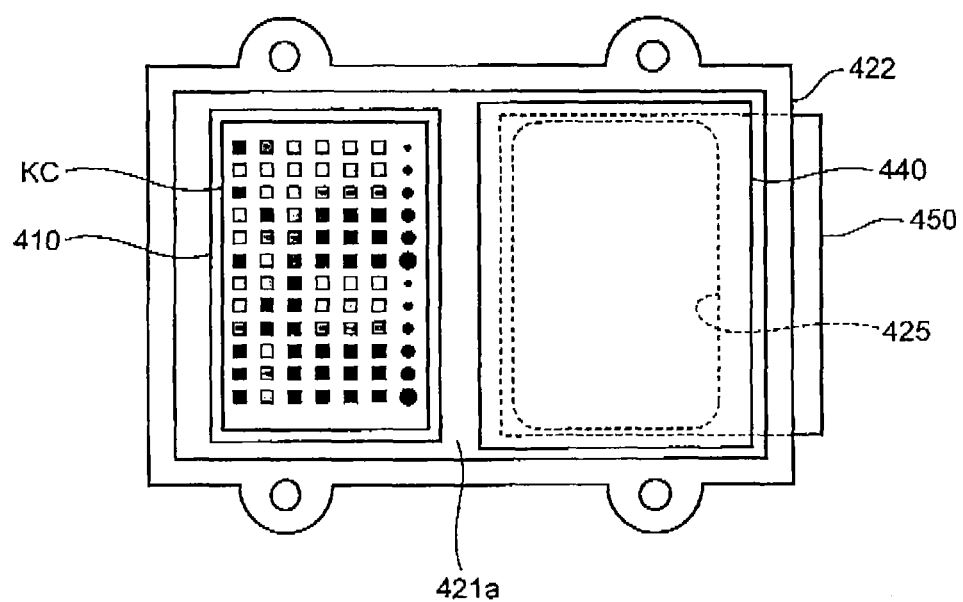
FIG. 5C is a plan view illustrating a bottom surface of a housing viewed in an X2 direction in FIG. 5A.

A specific example of the image capturing unit 42 will be described in detail below with reference to FIGS. 5A to 5C. FIGS. 5A to 5C are views of a specific example of the image capturing unit 42. FIG. 5A is a longitudinal cross-sectional view (taken along line X1-X1 in FIG. 5B) of the image capturing unit 42. FIG. 5B is a top view illustrating the inside of the image capturing unit 42 in a see-through manner. FIG. 5C is a plan view illustrating a bottom surface of a housing viewed in an X2 direction in FIG. 5A.

The image capturing unit 42 includes a housing 421 formed by combining a frame 422 and a board 423. The frame 422 is formed in a tube shape with a bottom in which one end side serving as the upper surface of the housing 421 is opened. The board 423 is fixed to the frame 422 with a fixing member 424 so as to close the open end of the frame 422 and to serve as the upper surface of the housing 421, and is integrated with the frame 422.

The housing 421 is fixed to the carriage 5 with a bottom surface 421a facing the recording medium P on the platen 22 with a predetermined gap d interposed therebetween. The bottom surface 421a of the housing 421 facing the recording medium P has an opening 425. The opening 425 allows the subject (color measurement target patch CP for color adjustments) formed on the recording medium P to be captured from the inside of the housing 421.

The housing 421 houses a sensor unit 430 that captures an image. The sensor unit 430 includes a two-dimensional image sensor 431, such as a charge-coupled device (CCD) sensor and a complementary metal oxide semiconductor (CMOS) sensor, and an imaging lens 432 that focuses an optical image in an image-capturing range of the sensor unit 430 onto a sensor surface of the two-dimensional image sensor 431. The two-dimensional image sensor 431 is mounted on the inner surface (component mounting surface) of the board 423, for example, with the sensor surface facing the bottom surface 421a of the housing 421. The imaging lens 432 is fixed in a state being positioned with respect to the two-dimensional image sensor 431 so as to maintain the positional relationship specified in accordance with the optical characteristics thereof.

On the inner side of the bottom surface 421a of the housing 421 facing the sensor unit 430, a chart plate 410 on which the reference chart KC is formed is arranged in a manner adjacent to the opening 425 provided to the bottom surface 421a. The chart plate 410 uses the surface opposite to the surface on which the reference chart KC is formed as an adhesive surface, for example. The chart plate 410 is adhered to the inner surface of the bottom surface 421a of the housing 421 with an adhesive, for example, and is held in a manner fixed to the housing 421. The reference chart KC is captured together with the subject (color measurement target patch CP) by the sensor unit 430. In other words, the sensor unit 430 captures the subject (color measurement target patch CP) outside of the housing 421 through the opening 425 provided to the bottom surface 421a of the housing 421. Simultaneously, the sensor unit 430 captures the reference chart KC on the chart plate 410 arranged on the inner side of the bottom surface 421a of the housing 421 as a target to be compared with the subject (color measurement target patch CP). The reference chart KC will be described later in greater detail.

The housing 421 accommodates therein an optical path length changing member 440. The optical path length changing member 440 is an optical element having a refractive index n (n is an arbitrary value) and allowing light to pass therethrough. Disposed on an optical path between the subject (color measurement target patch CP) outside the housing 421 and the sensor unit 430, the optical path length changing member 440 has a function of bringing an imaging surface of an optical image of the subject (color measurement target patch CP) close to an imaging surface of an optical image of the reference chart KC. Specifically, in the image capturing unit 42 in the present embodiment, by disposing the optical path length changing member 440 on the optical path between the subject (color measurement target patch CP) and the sensor unit 430, both the imaging surface of the optical image of the subject (color measurement target patch CP) outside the housing 421 and the imaging surface of the optical image of the reference chart KC are focused on the sensor surface of the two-dimensional image sensor 431 of the sensor unit 430. FIG. 5A illustrates an example in which the optical path length changing member 440 is placed on the bottom surface 421a of the housing 421. It is noted that the optical path length changing member 440 is not to be necessarily placed on the bottom surface 421a; alternatively, the optical path length changing member 440 may be disposed at any place on the optical path between the subject (color measurement target patch CP) outside the housing 421 and the sensor unit 430.

As light passes through the optical path length changing member 440, the optical path of the light is extended depending on the refractive index n of the optical path length changing member 440, resulting in the image being seemed floating. The floating amount C of the image is determined by the following formula, where Lp denotes the length of the optical path length changing member 440 in an optical axis direction.

$$C = Lp(1 - 1/n)$$

Let Lc be the distance between a principal point of the imaging lens 432 of the sensor unit 430 and the reference chart KC. Then, a distance L between the principal point of the imaging lens 432 and the front focal surface (image-capturing surface) of the optical image that passes through the optical path length changing member 440 is obtained by the following formula.

$$L = Lc + Lp(1 - 1/n)$$

When the refractive index n of the optical path length changing member 440 is 1.5, $L = Lc + Lp(\frac{1}{3})$, and the optical path of the optical image that passes through the optical path length changing member 440 can be extended by about one third of the length Lp of the optical path length changing member 440 in the optical axis direction. In this case, when Lp=9 [millimeters=mm], for example, then L=Lc+3 [mm]. Thus, if the image is captured under a condition in which there is a difference of 3 mm between the distance from the sensor unit 430 to the reference chart KC and the distance from the sensor unit 430 to the subject (color measurement target patch CP), the rear focal surface (image-capturing surface) of the optical image of the reference chart KC and the rear focal surface (image-capturing surface) of the subject (color measurement target patch CP) can both be focused onto the sensor surface of the two-dimensional image sensor 431 of the sensor unit 430.

The housing 421 also houses an illumination light source 426 that illuminates the subject (color measurement target patch CP) and the reference chart KC when the sensor unit 430 captures the subject (color measurement target patch CP) and the reference chart KC simultaneously. A light-emitting diode (LED) is used as the illumination light source 426, for example. In the present embodiment, two LEDs are used as the illumination light source 426. The two LEDs used as the illumination light source 426 are mounted on the inner surface of the board 423 together with the two-dimensional image sensor 431 of the sensor unit 430, for example. However, the illumination light source 426 only needs to be arranged at a position where the illumination light source 426 can illuminate the subject (color measurement target patch CP) and the reference chart KC. Therefore, the illumination light source 426 is not necessarily mounted on the board 423 directly.

In the present embodiment, as illustrated in FIG. 5B, the two LEDs used as the illumination light source 426 are arranged as follows: the projected positions of the two LEDs on the bottom surface 421a vertically viewed from the board 423 side to the bottom surface 421a side of the housing 421 are within an area between the opening 425 and the reference chart KC; and the projected positions are symmetrically arranged with respect to the sensor unit 430. In other words, a line obtained by connecting the two LEDs used as the illumination light source 426 passes through the center of the imaging lens 432 of the sensor unit 430. In addition, the opening 425 provided to the bottom surface 421a of the housing 421 and the reference chart KC are arranged at line-symmetric positions with respect to the line obtained by connecting the two LEDs. By arranging the two LEDs used as the illumination light source 426 in this manner, it is possible to illuminate the subject (color measurement target patch CP) and the reference chart KC under nearly the same conditions.

To illuminate the subject (color measurement target patch CP) outside of the housing 421 under the same illumination conditions as those for the reference chart KC arranged inside of the housing 421, it is necessary to illuminate the subject (color measurement target patch CP) only with the illumination light from the illumination light source 426 while preventing the subject (color measurement target patch CP) from being irradiated with outside light when the sensor unit 430 captures the subject (color measurement target patch CP). To prevent the subject (color measurement target patch CP) from being irradiated with outside light, it is effective that the gap d between the bottom surface 421a of the housing 421 and the recording medium P is made small such that the housing 421 blocks outside light toward the subject (color measurement target patch CP). However, if the gap d between the bottom surface 421a of the housing 421 and the recording medium P is made too small, the recording medium P may come into contact with the bottom surface 421a of the housing 421. As a result, there is a possibility that the image fails to be captured properly. Therefore, in consideration of the planarity of the recording medium P, it is preferable that the gap d between the bottom surface 421a of the housing 421 and the recording medium P be set to a small value within the range where the recording medium P does not come into contact with the bottom surface 421a of the housing 421. If the gap d between the bottom surface 421a of the housing 421 and the recording medium P is set to approximately 1 millimeter to 2 millimeters, for example, the recording medium P does not come into contact with the bottom surface 421a of the housing 421. In addition, it is possible to effectively prevent the subject (color measurement target patch CP) formed on the recording medium P from being irradiated with outside light.

To irradiate the subject (color measurement target patch CP) with the illumination light from the illumination light source 426 properly, it is preferable that the size of the opening 425 provided to the bottom surface 421a of the housing 421 be made larger than that of the subject (color measurement target patch CP). With such a configuration, no shadow generated by an edge of the opening 425 blocking the illumination light is projected on the subject (color measurement target patch CP).

As described earlier, the image forming apparatus 100 according to the present embodiment is configured such that ink is ejected from the nozzle arrays of the print head 6 mounted on the carriage 5 onto the recording medium P on the platen 22, thereby forming an image on the recording medium P. As a result, mist-like, very fine ink particles (hereinafter referred to as a "mist") are generated upon the ejection of the ink from the nozzle arrays of the print head 6. If the mist generated during the image formation enters the inside of the housing 421 from the outside of the housing 421 of the image capturing unit 42 fixedly disposed at the carriage 5 via the opening 425, the mist inside the housing 421 attaches, for example, to the sensor unit 430, the illumination light source 426, or the optical path length changing member 440. This may make it impossible to obtain accurate image data during, for example, the color adjustments to be made for the color measurement of the color measurement target patch CP. In the image capturing unit 42 of the present embodiment, therefore, the opening 425 in the bottom surface 421a of the housing 421 is covered with a mist prevention transmissive member 450 as illustrated in FIG. 5A and the mist generated during the image formation is thereby prevented from entering the inside of the housing 421.

The mist prevention transmissive member 450 is a transparent optical element having a sufficient transmission factor relative to the light from the illumination light source 426. The mist prevention transmissive member 450 is formed into a sheet having a size that generally covers the opening 425. The mist prevention transmissive member 450 is mounted in a slit formed along the bottom surface 421a of the housing 421, closing the entire surface of the opening 425 formed in the bottom surface 421a of the housing 421. The slit in which the mist prevention transmissive member 450 is mounted is open in a side surface of the housing 421. The mist prevention transmissive member 450 can be mounted in the slit by being inserted from the side surface of the housing 421. In addition, the mist prevention transmissive member 450 can be removed from the side surface of the housing 421, to be replaceable as appropriate.

Specific Example of the Reference Chart

Figure 6:
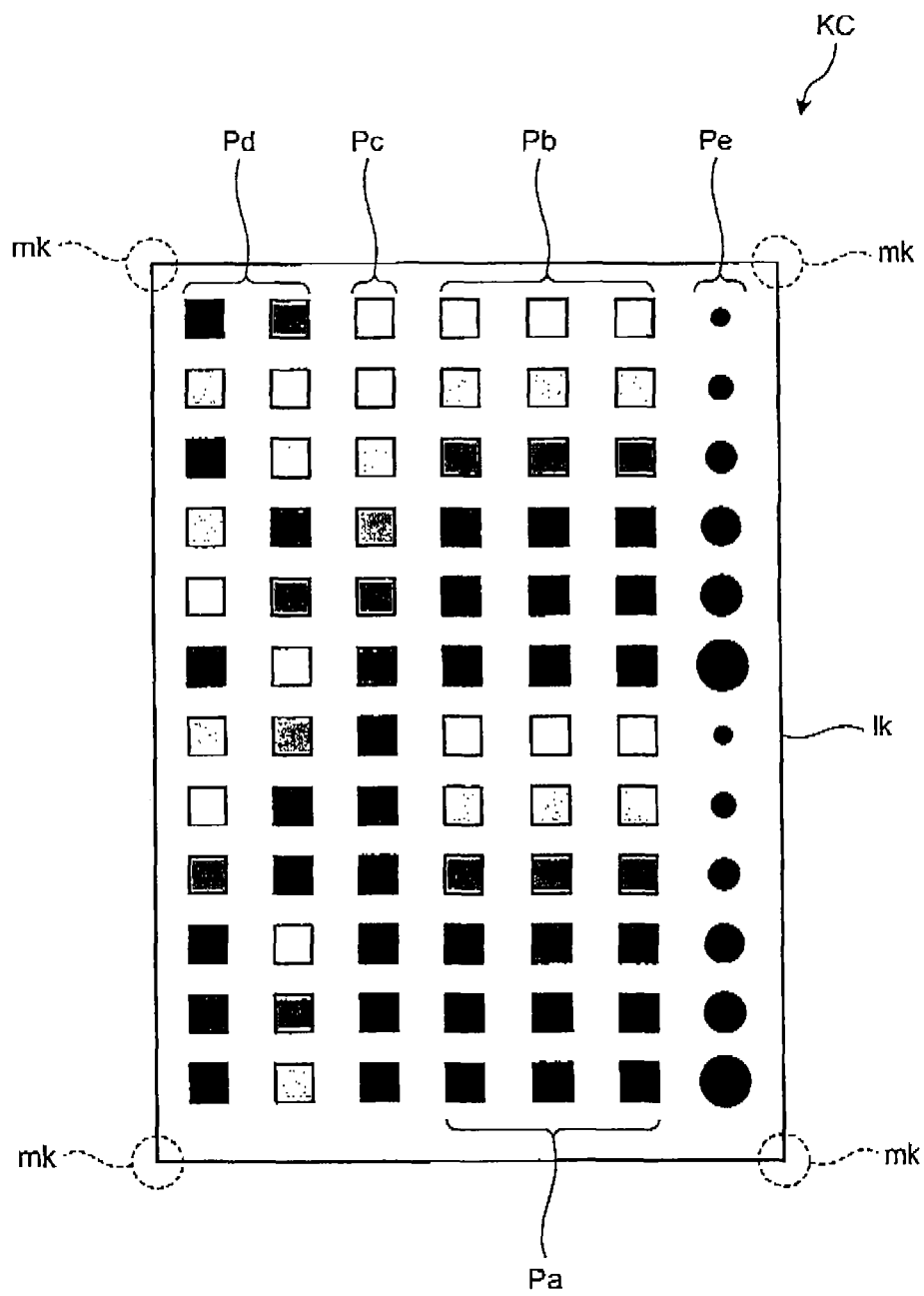
FIG. 6 is a view illustrating a specific example of a reference chart.

The reference chart KC on the chart plate 410 arranged inside of the housing 421 of the image capturing unit 42 will now be described in greater detail with reference to FIG. 6. FIG. 6 is a view illustrating a specific example of the reference chart KC.

The reference chart KC illustrated in FIG. 6 includes a plurality of color measurement reference patch arrays Pa to Pd in which patches for color measurement are arranged, a pattern array Pe in which dot diameter measurement patterns are arranged, a distance measurement line lk, and chart position identification markers mk.

The color measurement reference patch arrays Pa to Pd include the patch arrays Pa in which patches in primary colors of YMC are arranged in order of scale, the patch arrays Pb in which patches in secondary colors of RGB are arranged in order of scale, the patch array (achromatic scale patterns) Pc in which patches of a gray scale are arranged in order of scale, and the patch array Pd in which patches in tertiary colors are arranged. The dot diameter measurement pattern array Pe is a geometric shape measurement pattern array in which circular patterns in different sizes are arranged in order of size.

The distance measurement line lk is formed as a rectangular frame surrounding the reference patch arrays Pa to Pd and the dot diameter measurement pattern array Pe. The chart position identification markers mk are disposed at four corners of the distance measurement line lk, serving for identifying the position of each patch. From the image data of the reference chart KC acquired through the image capturing by the image capturing unit 42, the distance measurement line lk and the chart position identification markers mk at the four corners thereof are identified. This allows the position of the reference chart KC and the position of each pattern to be identified.

Each of the patches constituting the color measurement reference patch arrays Pa to Pd is used as a reference for the shade of color in which the image capturing condition during image capturing by the image capturing unit 42 is incorporated.

The configuration of the color measurement reference patch arrays Pa to Pd arranged in the reference chart KC is not limited only to that exemplified in FIG. 6 and any other patch arrays may be used. For example, a patch that allows as wide a range of colors as possible to be identified may be used. Alternatively, the patch arrays Pa of the primary colors of YMC or the patch array Pc of the gray scale may be formed of patches having the calorimetric values of the ink used in the image forming apparatus 100. Furthermore, the patch array Pb in the secondary colors of RGB of the reference chart KC may be formed of patches having the colorimetric values capable of being produced by the ink used in the image forming apparatus 100. Still alternatively, a standard color chart that specifies colorimetric values, such as Japan Color, may be used.

The reference chart KC, being disposed on the bottom surface 421a of the housing 421 of the image capturing unit 42 so as to be adjacent to the opening 425, can be imaged by the sensor unit 430 simultaneously with the subject, such as the color measurement target patch CP.

Schematic Configuration of Control Mechanism of the Image Forming Apparatus

Figure 7:
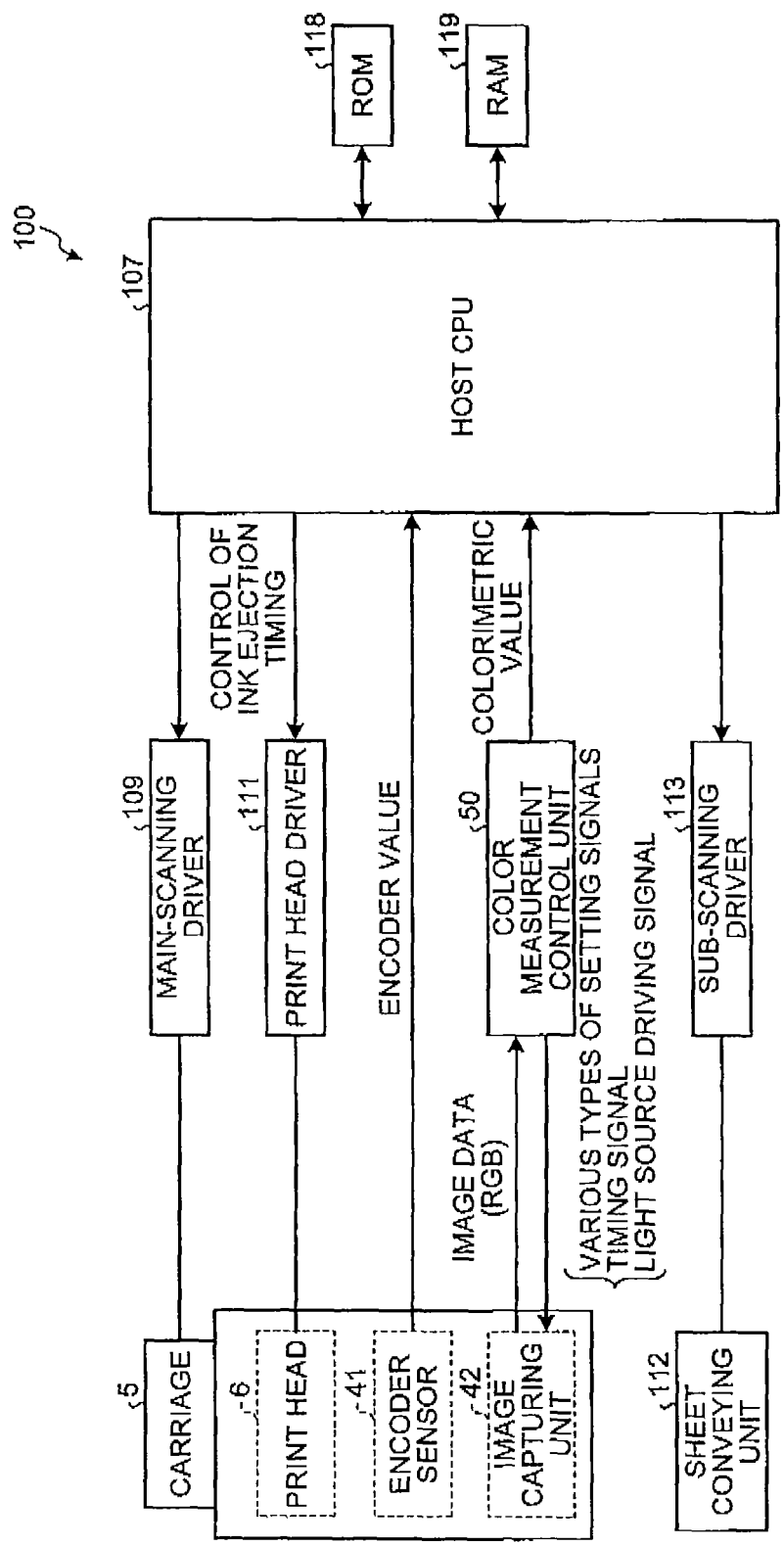
FIG. 7 is a block diagram illustrating a schematic configuration of a control mechanism of the image forming apparatus.

A schematic configuration of a control mechanism of the image forming apparatus 100 according to the present embodiment will now be described with reference to FIG. 7. FIG. 7 is a block diagram of the schematic configuration of the control mechanism of the image forming apparatus 100.

The control mechanism of the image forming apparatus 100 according to the present embodiment includes the host CPU 107, a read-only memory (ROM) 118, a random accesses memory (RAM) 119, a main-scanning driver 109, a print head driver 111, a color measurement control unit 50, a sheet conveying unit 112, a sub-scanning driver 113, the print head 6, the encoder sensor 41, and the image capturing unit 42. The print head 6, the encoder sensor 41, and the image capturing unit 42 are mounted on the carriage 5 as described above.

The host CPU 107 supplies data of an image to be formed on the recording medium P and a drive control signal (pulse signal) to each driver, and controls the whole of the image forming apparatus 100. Specifically, the host CPU 107 controls drive of the carriage 5 in the main-scanning direction via the main-scanning driver 109. The host CPU 107 controls the ink ejection timing of the print head 6 via the print head driver 111. The host CPU 107 controls drive of the sheet conveying unit 112 including the carriage rollers and the sub-scanning motor via the sub-scanning driver 113.

The encoder sensor 41 outputs an encoder value obtained by detecting a mark of the encoder sheet 40 to the host CPU 107. Based on the encoder value from the encoder sensor 41, the host CPU 107 controls drive of the carriage 5 in the main-scanning direction via the main-scanning driver 109.

As described above, the image capturing unit 42 causes the sensor unit 430 to capture the color measurement target patch CP and the reference chart KC on the chart plate 410 arranged inside of the housing 421 simultaneously when color measurement is performed on the color measurement target patch CP formed on the recording medium P. The image capturing unit 42 then outputs the image data including the color measurement target patch CP and the reference chart KC to the color measurement control unit 50.

The color measurement control unit 50 controls operations of the image capturing unit 42 and acquires image data from the image capturing unit 42. During the color adjustments of the image forming apparatus 100, the color measurement control unit 50 acquires the image data of the color measurement target patch CP and the reference chart KC from the image capturing unit 42 and, based on the acquired image data, calculates the colorimetric value (color specification value in the standard color space) of the color measurement target patch CP. The colorimetric value of the color measurement target patch CP calculated by the color measurement control unit 50 is sent to the host CPU 107 and used for the color adjustments of the image forming apparatus 100. The color measurement control unit 50, together with the image capturing unit 42 and the host CPU 107, constitutes the color measuring device.

The color measurement control unit 50 supplies various types of setting signals, a timing signal, a light source driving signal, and the like to the image capturing unit 42, and controls image capturing performed by the image capturing unit 42. The various types of setting signals include a signal for setting an operation mode of the sensor unit 430, and a signal for setting image-capturing conditions, such as the shutter speed and gain in automatic gain control (AGC). The color measurement control unit 50 acquires these setting signals from the host CPU 107, and supplies the signals to the image capturing unit 42. The timing signal is a signal for controlling the operational timing of image capturing performed by the sensor unit 430. The light source driving signal is a signal for controlling drive of the illumination light source 426 that illuminates the image-capturing range of the sensor unit 430. The color measurement control unit 50 generates the timing signal and the light source driving signal, and supplies the signals to the image capturing unit 42.

The ROM 118 stores therein a computer program of an operating process executed by the host CPU 107 and various types of control data, for example. The RAM 119 is used as a working memory for the host CPU 107.

Configuration of the Control Mechanism of the Color Measuring Device

Figure 8:
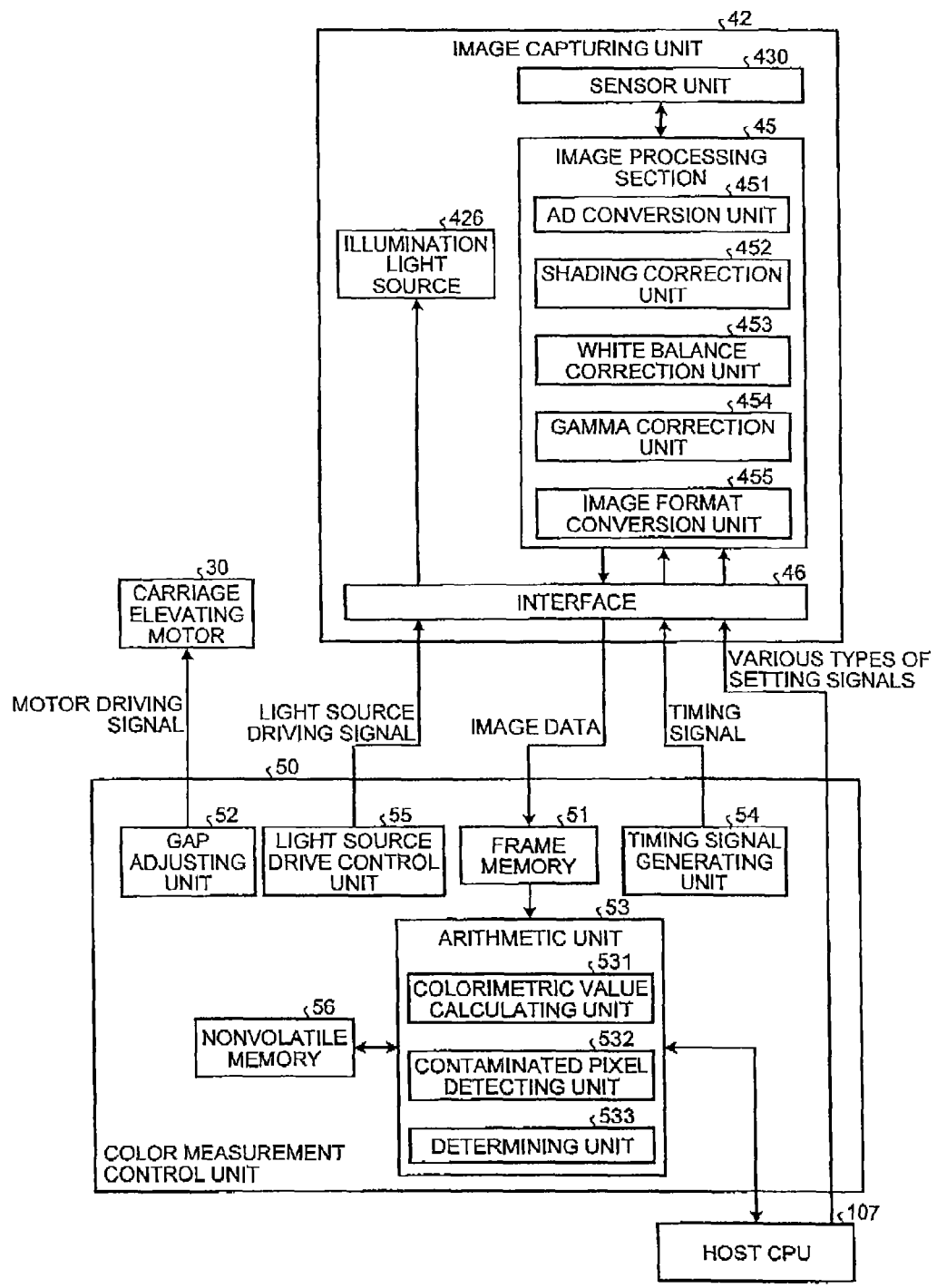
FIG. 8 is a block diagram illustrating an exemplary configuration of a control mechanism of a color measuring device.

A control mechanism of the color measuring device will now be specifically described with reference to FIG. 8. FIG. 8 is a block diagram of an exemplary configuration of the control mechanism of the color measuring device.

The color measuring device includes the image capturing unit 42, the color measurement control unit 50, and the host CPU 107. The image capturing unit 42 includes a data processing section 45 and an interface 46 in addition to the sensor unit 430 and the illumination light source 426. It is noted that FIG. 8 illustrates also the block of the carriage elevating motor 30 for driving the image capturing unit 42, because the image capturing unit 42 is configured, as described earlier, so as to be moved with the carriage 5 in a direction of being spaced away from, or brought closer to, the recording medium P (raised or lowered).

The data processing section 45 processes image data captured by the sensor unit 430. The data processing section 45 includes an analog to digital (AD) conversion unit 451, a shading correction unit 452, a white balance correction unit 453, a gamma correction unit 454, and an image format conversion unit 455.

The AD conversion unit 451 converts an analog signal output by the sensor unit 430 into a digital signal.

The shading correction unit 452 corrects an error in the image data caused by unevenness in the illumination provided by the illumination light source 426 to the image-capturing range of the sensor unit 430.

The white balance correction unit 453 corrects the white balance of the image data.

The gamma correction unit 454 corrects the image data so as to compensate for the linearity in the sensitivity of the sensor unit 430.

The image format conversion unit 455 converts the image data into an arbitrary format.

The interface 46 is an interface by which the image capturing unit 42 acquires the various types of setting signals, the timing signal, and the light source driving signal supplied from the color measurement control unit 50, and by which the image capturing unit 42 transmits the image data to the color measurement control unit 50.

The color measurement control unit 50 includes a frame memory 51, a gap adjusting unit 52, an arithmetic unit 53, a timing signal generating unit 54, a light source drive control unit 55, and a nonvolatile memory 56.

The frame memory 51 temporarily stores therein the image data transmitted from the image capturing unit 42. The image data temporarily stored in the frame memory 51 is transmitted to the arithmetic unit 53.

The gap adjusting unit 52 generates a motor driving signal for driving the carriage elevating motor 30 and supplies the signal to the carriage elevating motor 30. The carriage elevating motor 30 is operated based on the motor driving signal generated by the gap adjusting unit 52. This operation of the carriage elevating motor 30 causes the carriage 5 and the image capturing unit 42 fixed to the carriage 5 to raise or lower, so that the gap d from the recording medium P is adjusted.

The timing signal generating unit 54 generates a timing signal that controls an operational timing of image capturing performed by the sensor unit 430 of the image capturing unit 42, and supplies the timing signal to the image capturing unit 42.

The light source drive control unit 55 generates a light source driving signal for driving the illumination light source 426 of the image capturing unit 42, and supplies the light source driving signal to the image capturing unit 42.

The gap adjusting unit 52, the timing signal generating unit 54, and the light source drive control unit 55 perform the abovementioned operations under the control of, for example, the host CPU 107.

The arithmetic unit 53 includes a colorimetric value calculating unit 531, a contaminated pixel detecting unit 532, and a determining unit 533.

The colorimetric value calculating unit 531 calculates the colorimetric value of the color measurement target patch CP based on the image data of the color measurement target patch CP and the reference chart KC obtained through the simultaneous capturing by the sensor unit 430 of the image capturing unit 42 of the images of the color measurement target patch CP formed on the recording medium P and the reference chart KC. The colorimetric value of the color measurement target patch CP calculated by the calorimetric value calculating unit 531 is sent to the host CPU 107. A specific example of the process performed by the calorimetric value calculating unit 531 will be described in detail later.

The contaminated pixel detecting unit 532 and the determining unit 533 detect a contamination that impedes the appropriate calculation of the colorimetric value. For example, the mist prevention transmissive member 450 of the image capturing unit 42 can be contaminated with the mist of the ink ejected from the nozzle arrays of the print head 6 or dust in the air deposited thereon. The subject may also be contaminated by, for example, a contamination on the recording medium P or dust deposited thereon. These contaminations can adversely affect the calculation of the colorimetric value of the color measurement target patch CP based on the image data obtained through the image capturing by the sensor unit 430. Thus, in the image forming apparatus 100 according to the present embodiment, the contaminated pixel detecting unit 532 and the determining unit 533 of the arithmetic unit 53 detect a contamination of the mist prevention transmissive member 450 or the recording medium P at regular intervals or before a color measurement to be performed during the color adjustments. This color measurement will be described later.

The contaminated pixel detecting unit 532 detects a contamination (contaminated pixels) from each of a first image captured by the sensor unit 430 of the image capturing unit 42 at a position close to the subject and a second image captured by the sensor unit 430 of the image capturing unit 42 at a position away from the subject. Specifically, the first image is obtained by the image capturing performed by the sensor unit 430 when the housing 421 is located at a first position in the optical axis direction of the sensor unit 430, and the second image is obtained by the image capturing performed by the sensor unit 430 when the housing 421 is located at a second position spaced farther away from the subject than the first position in the optical axis direction of the sensor unit 430. At this time, the contaminated pixel detecting unit 532 detects contaminated pixels from each of the first image and the second image. It is noted that the position of the housing 421 in the optical axis direction of the sensor unit 430 can be adjusted through control of the motor driving signal supplied from the gap adjusting unit 52 to the carriage elevating motor 30.

The determining unit 533 compares a pixel of the first image with a pixel of the second image that are located at an identical pixel position. Then, when the number of pixels in which a contamination is detected from either only one of the first image and the second image is less than a threshold, the determining unit 533 determines that the mist prevention transmissive member 450 is contaminated. Specifically, the determining unit 533 finds a difference between the first and second images such that contaminated pixels located at the same position are canceled and, if the number of contaminated pixels that are not canceled is less than the threshold, determines that the mist prevention transmissive member 450 is contaminated. Specific examples of the processes performed by the contaminated pixel detecting unit 532 and the determining unit 533 will be described in detail later.

The nonvolatile memory 56 stores therein various types of data used in calculation performed in the arithmetic unit 53 and data representing the calculation results. For example, the nonvolatile memory 56 stores therein, for example, a memory table Tb1, a reference value linear conversion matrix, a reference RGB linear conversion matrix, and position information on a contamination block of the mist prevention transmissive member 450.

Color Measurement Method for the Color Measurement Target Patch

A specific example of a color measurement method for the color measurement target patch CP performed by the image forming apparatus 100 according to the present embodiment will be described in detail below with reference to FIGS. 9 to 15. This color measurement method includes a preprocess performed when the image forming apparatus 100 is in an initialized state (in an initial state immediately after production or overhaul) and a color measurement process performed during the color adjustments for the image forming apparatus 100. The color measurement method to be described below is only an example and is not the only possible method.

Figure 9:
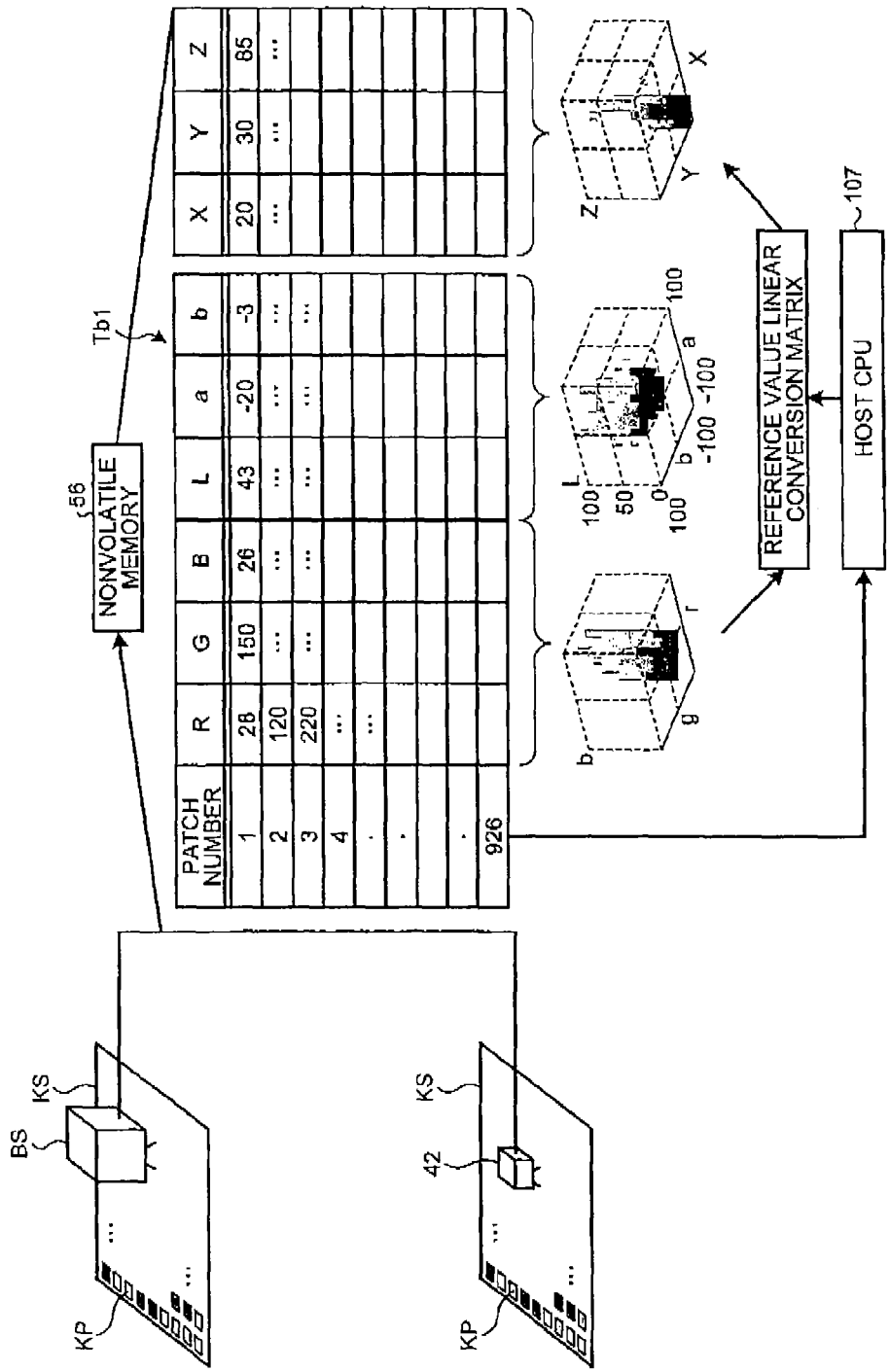
FIG. 9 is a diagram illustrating a process for acquiring reference colorimetric values and reference RGB values and a process for generating a reference value linear conversion matrix.

FIG. 9 is a diagram illustrating a process for acquiring reference colorimetric values and reference RGB values and a process for generating a reference value linear conversion matrix. These processes illustrated in FIG. 9 are to be performed as preprocesses. The preprocesses use a reference sheet KS on which a plurality of reference patches KP are arrayed. The reference patches KP on the reference sheet KS are equivalent to the patches of the reference chart KC in the image capturing unit 42.

Of Lab values and XYZ values that are the colorimetric values of the multiple reference patches KP of the reference sheet KS, at least either one of the values (both the Lab values and the XYZ values in the example illustrated in FIG. 9) are stored in the memory table Tb1 of the nonvolatile memory 56, each of the values being associated with a corresponding patch number. The colorimetric values of the reference patches KP may be obtained in advance through color measurement using, for example, a spectroscope BS. Any known colorimetric value of the reference patch KP may be directly used. The colorimetric values of the reference patches KP stored in the memory table Tb1 of the nonvolatile memory 56 are referred to as "reference colorimetric values".

Meanwhile, "Lab (a Lab value)" means, for example, a CIELAB (CIE 1976 L*a*b) color space (or a value in the CIELAB color space). For convenience of explanation, "L*a*b*"' may be described as "Lab" in this description.

Then, the reference sheet KS is placed on the platen 22 and, through the control of movement of the carriage 5, the image capturing unit 42 performs image capturing with the multiple reference patches KP on the reference sheet KS as a subject. The RGB values of the reference patches KP obtained through the image capturing by the image capturing unit 42 are stored in the memory table Tb1 of the nonvolatile memory 56, each of the RGB values being associated with a corresponding patch number. Specifically, the memory table Tb1 of the nonvolatile memory 56 stores therein the colorimetric values and the RGB values of the respective reference patches KP arrayed on the reference sheet KS, these values being associated with the respective patch numbers of the reference patches KP. The RGB values of the reference patches KP stored in the memory table Tb1 of the nonvolatile memory 56 are referred to as "reference RGB values". The reference RGB values represent characteristics of the image capturing unit 42.

When the reference colorimetric values and the reference RGB values of the reference patches KP are stored in the memory table Tb1 of the nonvolatile memory 56, the host CPU 107 of the image forming apparatus 100 generates a reference value linear conversion matrix with which to perform mutual conversion relative to a pair of the XYZ values as the reference colorimetric values and the reference RGB values associated with the same patch number and stores the reference value linear conversion matrix in the nonvolatile memory 56. If only the Lab values are stored as the reference colorimetric values in the memory table Tb1 of the nonvolatile memory 56, the reference value linear conversion matrix may be generated after the Lab values are converted to the XYZ values using a known conversion formula that converts the Lab value to a corresponding XYZ value.

Figures 10A, 10B:
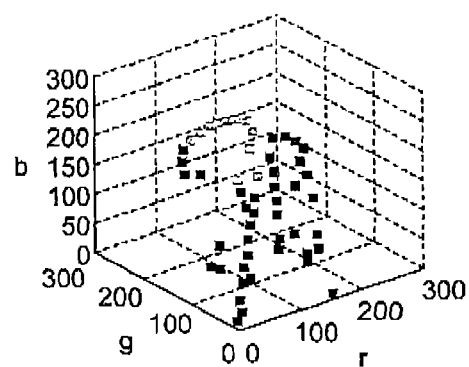
FIGS. 10A and 10B are exemplary diagrams illustrating initial reference RGB values.

When the image capturing unit 42 captures the image of the multiple reference patches KP of the reference sheet KS, the image of the reference chart KC disposed at the image capturing unit 42 is captured simultaneously. The RGB values of the patches of the reference chart KC obtained through this image capturing are also stored in the memory table Tb1 of the nonvolatile memory 56, the RGB values being associated with the respective patch numbers. The RGB values of the patches of the reference chart KC stored in the memory table Tb1 of the nonvolatile memory 56 through the foregoing preprocesses are referred to as "initial reference RGB values". FIGS. 10A and 10B are exemplary diagrams illustrating the initial reference RGB values. FIG. 10A illustrates how the initial reference RGB values (RdGdBd) are stored in the memory table Tb1, illustrating that the initial reference RGB values (RdGdBd) are stored in the memory table Tb1 in association with initial reference Lab values (Ldadbd) that represent the initial reference RGB values (RdGdBd) converted to Lab values and initial reference XYZ values (XdYdZd) that represent the initial reference RGB values (RdGdBd) converted to XYZ values, together with the initial reference RGB values (RdGdBd). FIG. 10B is a scatter diagram on which the initial reference RGB values of the patches of the reference chart KC are plotted.

After the foregoing initial processes are completed, the image forming apparatus 100 causes the host CPU 107 to perform, based on, for example, image data or print settings input from outside, main-scanning movement control for the carriage 5, conveyance control for the recording medium P through the use of the sheet conveying unit 112, and driving control for the print head 6, to thereby control ejection of ink from the print head 6 and output the image to the recording medium P, while conveying the recording medium P intermittently. At this time, an ink ejection amount from the print head 6 can vary depending on, for example, characteristics unique to the apparatus or changes with time. A change in the ink ejection amount results in an image being formed with a color different from a color intended by the user, leading to degraded color reproducibility. Thus, the image forming apparatus 100 performs a color measurement process that obtains the colorimetric value of the color measurement target patch CP at a predetermined timing of the color adjustments. The color adjustments are then performed based on the colorimetric value of the color measurement target patch CP obtained through the color measurement process, thereby improving the color reproducibility.

FIG. 11 is a diagram illustrating an outline of the color measurement. During the color adjustments, the image forming apparatus 100 ejects ink from the print head 6 onto the recording medium P placed on the platen 22 to thereby form the color measurement target patch CP. The recording medium P on which the color measurement target patch CP is formed will hereinafter be referred to as the "adjustment sheet CS". Formed on the adjustment sheet CS is the color measurement target patch CP in which the output characteristic of the image forming apparatus 100 during its adjustments, more particularly, the output characteristic of the print head 6 is reflected. It is noted that color patch data of the color measurement target patch CP is stored in, for example, the nonvolatile memory 56 in advance.

Next, as illustrated in FIG. 11, the image forming apparatus 100 controls the movement of the carriage 5 so as to move the image capturing unit 42 to a position at which to face the color measurement target patch CP formed on the adjustment sheet CS that is either placed on the platen 22 or in a condition of being held on the platen 22 without being fed out when the adjustment sheet CS is prepared. The image capturing unit 42 then simultaneously captures an image of the color measurement target patch CP and an image of the patches of the reference chart KC disposed at the image capturing unit 42. The image data of the color measurement target patch CP and the patches of the reference chart KC captured simultaneously by the image capturing unit 42 is subjected to required image processing performed by the data processing section 45 before being sent to the color measurement control unit 50 and then temporarily stored in the frame memory 51. Of the image data simultaneously captured by the image capturing unit 42 and temporarily stored in the frame memory 51, image data (RGB values) of the color measurement target patch CP is referred to as "color measurement target RGB values" And image data (RGB values) of the patches of the reference chart KC is referred to as "color measurement reference RGB values (RdsGdsBds)". The "color measurement reference RGB values (RdsGdsBds)" is stored in the nonvolatile memory 56.

The colorimetric value calculating unit 531 of the color measurement control unit 50 uses the reference RGB linear conversion matrix to be described later to perform conversion from the color measurement target RGB values temporarily stored in the frame memory 51 to initialization color measurement target RGB values (RsGsBs) (Step 610). The initialization color measurement target RGB values (RsGsBs) represent the color measurement target RGB values from which effects are eliminated from a change with time in the image capturing condition of the image capturing unit 42 that may occur from the initial state when the preprocesses are performed to the time of adjustments at which the color measurement is performed, for example, a change with time of the illumination light source 426 or of the two-dimensional image sensor 431.

The colorimetric value calculating unit 531 thereafter performs a basic color measurement to be described later on the initialization color measurement target RGB values (RsGsBs) converted from the color measurement target RGB values (Step S20) and acquires a Lab colorimetric value that is the colorimetric value of the color measurement target patch CP.

Figure 12:
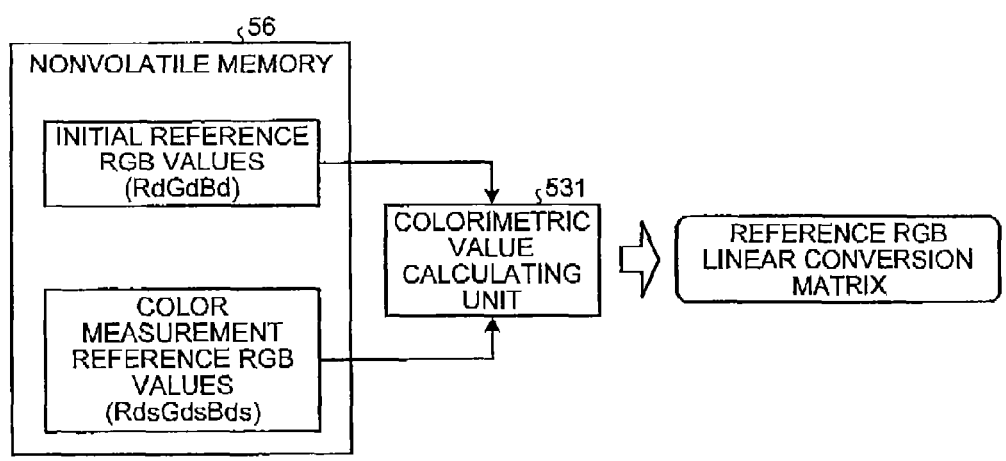
FIG. 12 is a diagram illustrating a process for generating a reference RGB linear conversion matrix.

FIG. 12 is a diagram illustrating a process for generating the reference RGB linear conversion matrix. FIGS. 13A and 13B are diagrams illustrating a relation between the initial reference RGB values and the color measurement reference RGB values. Before performing the process for converting the color measurement target RGB values to the initialization color measurement target RGB values (RsGsBs) (Step S10), the calorimetric value calculating unit 531 generates the reference RGB linear conversion matrix to be used for the conversion. Specifically, as illustrated in FIG. 12, the colorimetric value calculating unit 531 reads from the nonvolatile memory 56 the initial reference RGB values (RdGdBd) obtained in the preprocess performed when the image forming apparatus 100 is in the initial state and the color measurement reference RGB values (RdsGdsBds) obtained during the adjustments. The colorimetric value calculating unit 531 thereby generates the reference RGB linear conversion matrix for converting the color measurement reference RGB values (RdsGdsBds) to the initial reference RGB values (RdGdBd). The calorimetric value calculating unit 531 then stores the generated reference RGB linear conversion matrix in the nonvolatile memory 56.

Figure 13:
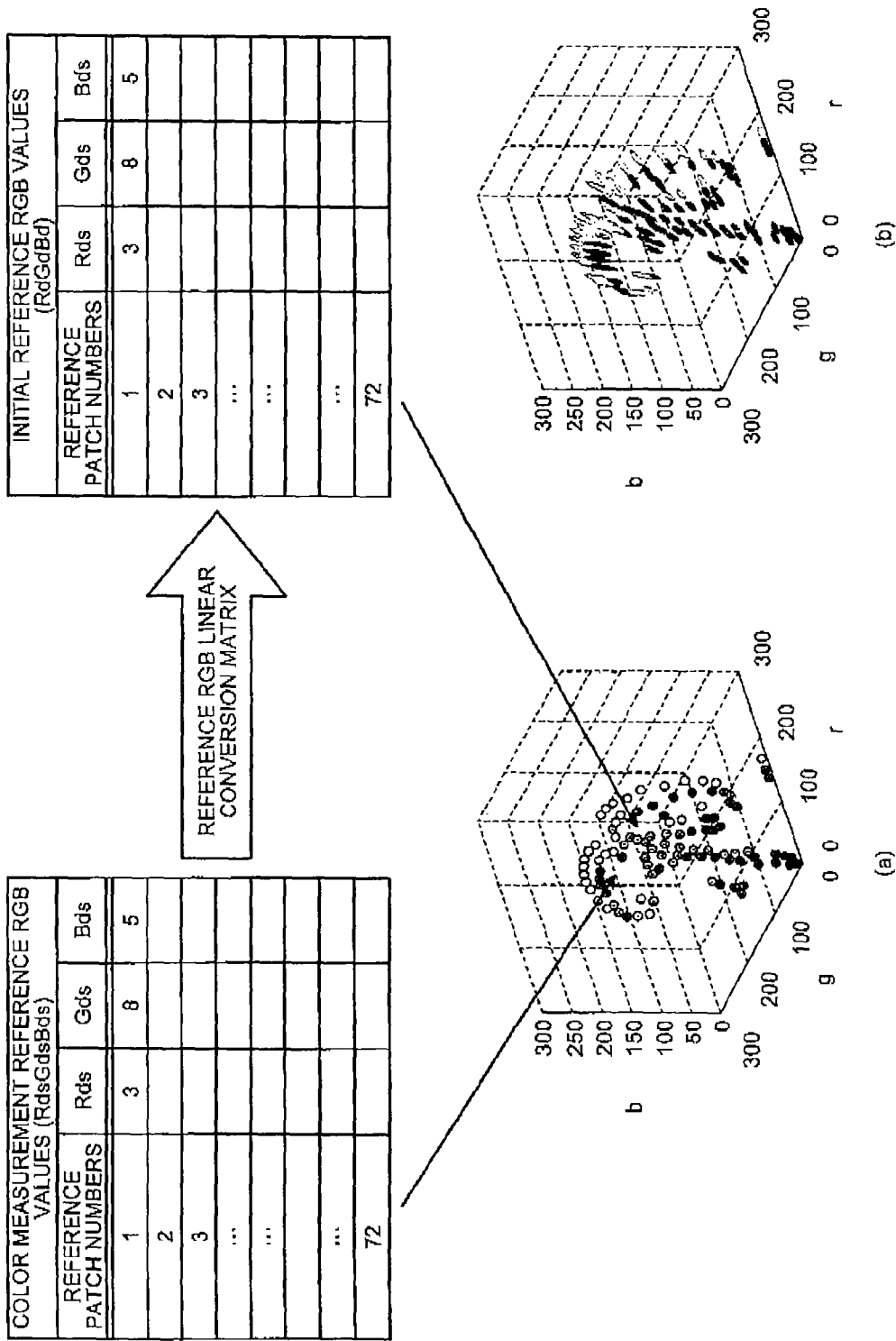
FIG. 13 is a diagram illustrating a relation between the initial reference RGB values and color measurement reference RGB values.

In part (a) of FIG. 13, blank dots represent the initial reference RGB values (RdGdBd) plotted in an rgb space and blackened dots represent the color measurement reference RGB values (RdsGdsBds) plotted in the rgb space. As is known from part (a) of FIG. 13, the color measurement reference RGB values (RdsGdsBds) fluctuate from the initial reference RGB values (RdGdBd) and directions of these fluctuations in the rgb space are substantially the same as illustrated in part (b) of FIG. 13, but directions of deviation vary depending on hue. Causes of these fluctuations in the RGB values of the images captured from the patches of the same reference chart KC include, but not limited to, changes with time in the illumination light source 426 and the two-dimensional image sensor 431.

An error may, however, occur in the colorimetric value from obtaining the calorimetric value using the color measurement target RGB values acquired by capturing the image of the color measurement target patch CP in the condition of fluctuating RGB values acquired by the image capturing by the image capturing unit 42, the error representing the fluctuations. The image forming apparatus 100 according to the present embodiment thus enables the colorimetric value of the color measurement target patch CP to be accurately acquired by the following method: specifically, for the initial reference RGB values (RdGdBd) and the color measurement reference RGB values (RdsGdsBds), an estimation method, such as the least square method, is used to find the reference RGB linear conversion matrix that converts the color measurement reference RGB values (RdsGdsBds) to the initial reference RGB values (RdGdBd); this reference RGB linear conversion matrix is then used to convert the color measurement target RGB values obtained through the image capturing of the color measurement target patch CF by the image capturing unit 42 to the initialization color measurement target RGB values (RsGsBs); and the converted initialization color measurement target RGB values (RsGsBs) is subjected to the basic color measurement to be described later.

The reference RGB linear conversion matrix may be an even higher order nonlinear matrix, in addition to being a first-order matrix. A higher-order matrix can improve conversion accuracy for high nonlinearity between the rgb space and the XYZ space.

After having converted the color measurement target RGB values obtained through the image capturing of the color measurement target patch CP to the initialization color measurement target RGB values (RsGsBs) using the reference RGB linear conversion matrix (Step S10), the colorimetric value calculating unit 531 performs the basic color measurement of Step S20 for the initialization color measurement target RGB values (RsGsBs) as described earlier.

Figure 14:
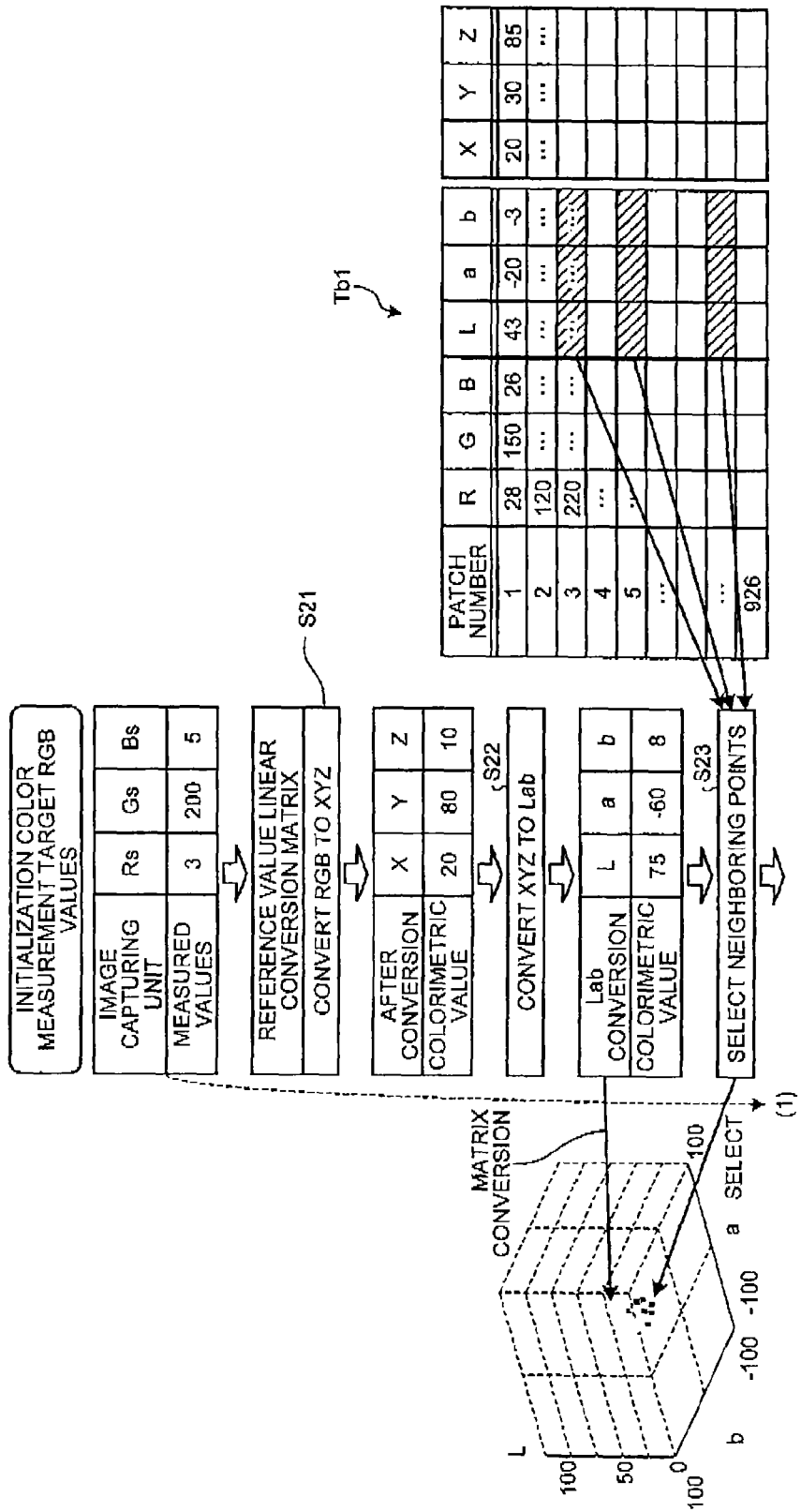
FIG. 14 is a diagram illustrating a basic color measurement process.
Figure 15:
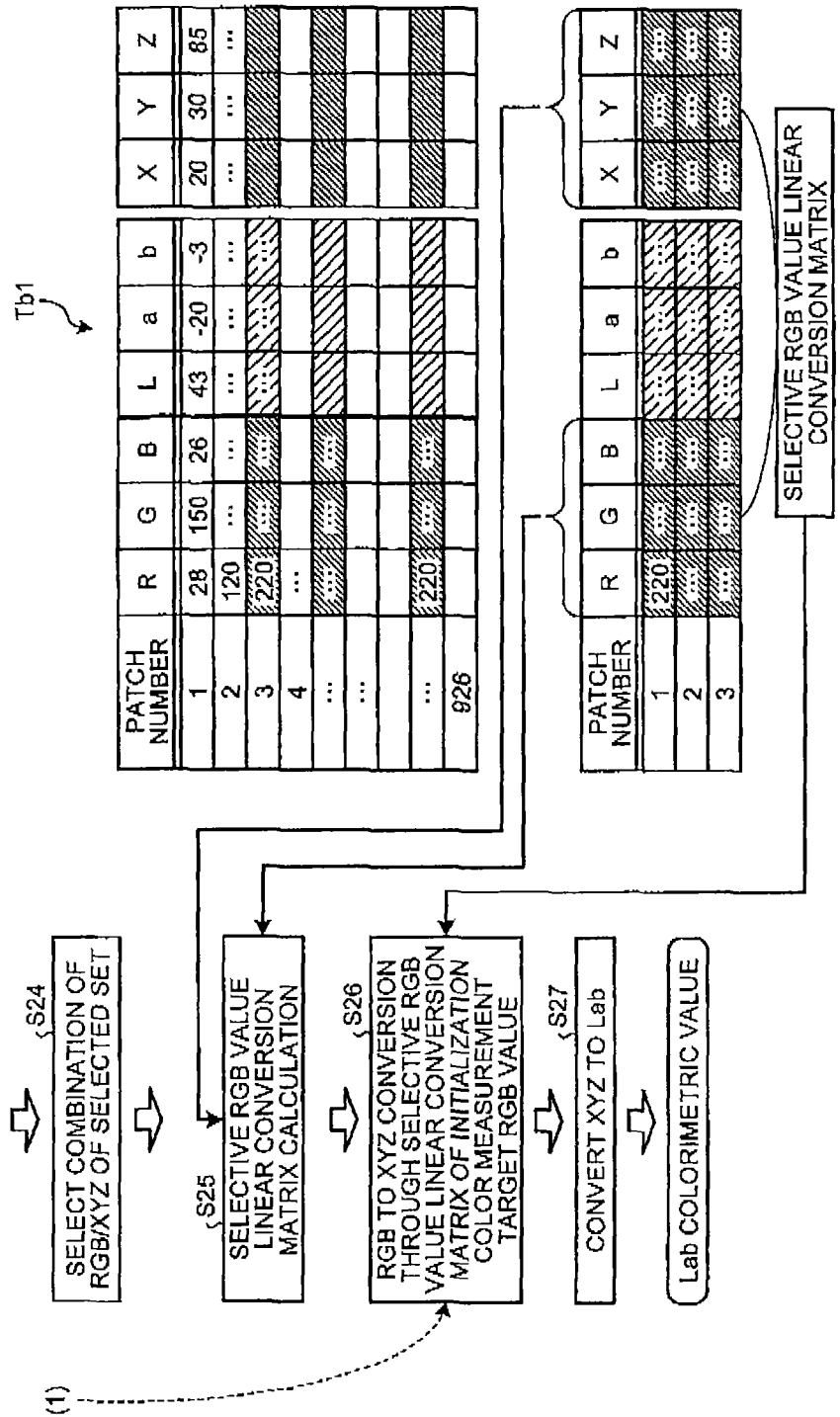
FIG. 15 is a diagram illustrating the basic color measurement process.

FIGS. 14 and 15 are diagrams illustrating the basic color measurement process. The colorimetric value calculating unit 531 first reads the reference value linear conversion matrix generated in the preprocesses and stored in the nonvolatile memory 56 and, using the reference value linear conversion matrix, converts the initialization color measurement target RGB values (RsGsBs) to first XYZ values before storing the first XYZ values in the nonvolatile memory 56 (Step S21). FIG. 14 illustrates an example in which the initialization color measurement target RGB values (3, 200, 5) are converted with the reference value linear conversion matrix to the first XYZ values (20, 80, 10).

Next, the colorimetric value calculating unit 531 uses a known conversion formula to convert the first XYZ values converted from the initialization color measurement target RGB values (RsGsBs) at Step S21 to first Lab values and stores the first Lab values in the nonvolatile memory 56 (Step S22). FIG. 14 illustrates an example in which the first XYZ values (20, 80, 10) are converted with the known conversion formula to the first Lab values (75, −60, 8).

The colorimetric value calculating unit 531 then searches through the multiple reference colorimetric values (Lab values) stored in the memory table Tb1 of the nonvolatile memory 56 during the preprocesses and, out of the reference colorimetric values (Lab values), selects a set of multiple patches (neighboring color patches) having reference colorimetric values (Lab values) close in distance to the first Lab values in the Lab space (Step S23). Methods for selecting patches with a close distance include calculating a distance from the first Lab values and selecting a plurality of patches having Lab values close in distance to the first Lab values (Lab values crosshatched in FIG. 14).

Then, as illustrated in FIG. 15, the colorimetric value calculating unit 531 refers to the memory table Tb1 and, for each of the neighboring color patches selected at Step S23, picks out the RGB values (reference RGB values) and the XYZ values that are paired up with the Lab values. From among these multiple RGB values and XYZ values, the colorimetric value calculating unit 531 selects a combination of the RGB values and the XYZ values (Step S24). The colorimetric value calculating unit 531 then obtains, using, for example, the least square method, a selective RGB value linear conversion matrix for converting the RGB values of the selected combination (selected set) to the XYZ values and stores the obtained selective RGB value linear conversion matrix in the nonvolatile memory 56 (Step S25).

The colorimetric value calculating unit 531 then uses the generated selective RGB value linear conversion matrix to convert the initialization color measurement target RGB values (RsGsBs) to second XYZ values (Step S26). In addition, the colorimetric value calculating unit 531 converts the second XYZ values obtained at Step S26 to second Lab values using a known conversion formula (Step S27) and defines the obtained second Lab values as final calorimetric values of the color measurement target patch CP. The image forming apparatus 100 performs the color adjustments based on the colorimetric values obtained through the foregoing color measurement process, to thereby achieve enhanced color reproducibility.

Specific Examples of the Processes Performed by the Contaminated Pixel Detecting Unit and the Determining Unit Specific examples of the processes performed by the contaminated pixel detecting unit 532 and the determining unit 533 will be described below with reference to FIGS. 16 to 27. As described above, the image forming apparatus 100 according to the present embodiment calculates the calorimetric value of the color measurement target patch CP using the image captured by the image capturing unit 42. The image capturing unit 42 is configured so as to use the sensor unit 430 disposed inside the housing 421 to capture the image of the subject outside the housing 421 through the opening 425 formed in the bottom surface 421a of the housing 421. To prevent entry of the mist in the inside of the housing 421, the mist prevention transmissive member 450 closes the opening 425. In the image capturing unit 42 having a configuration as described above, if the mist prevention transmissive member 450 is contaminated with the mist or dust, possible effects of the contamination cause a change in the image to surface, which may impair a proper calculation of the colorimetric value. The proper calculation of the colorimetric value may also be impaired if the recording medium P on which the subject color measurement target patch CP is formed is contaminated with dust. Thus, the image forming apparatus 100 according to the present embodiment includes the contaminated pixel detecting unit 532 and the determining unit 533 and, through the processes performed by the contaminated pixel detecting unit 532 and the determining unit 533, a contamination of the mist prevention transmissive member 450 or the recording medium P is to be detected. The example illustrated in FIG. 8 is configured such that the arithmetic unit 53 of the color measurement control unit 50 includes the contaminated pixel detecting unit 532 and the determining unit 533; however, the contaminated pixel detecting unit 532 and the determining unit 533 may be configured so as to perform their respective functions in the image capturing unit 42 and, for example, the data processing section 45 of the image capturing unit 42 may include the contaminated pixel detecting unit 532 and the determining unit 533.

Figure 16:
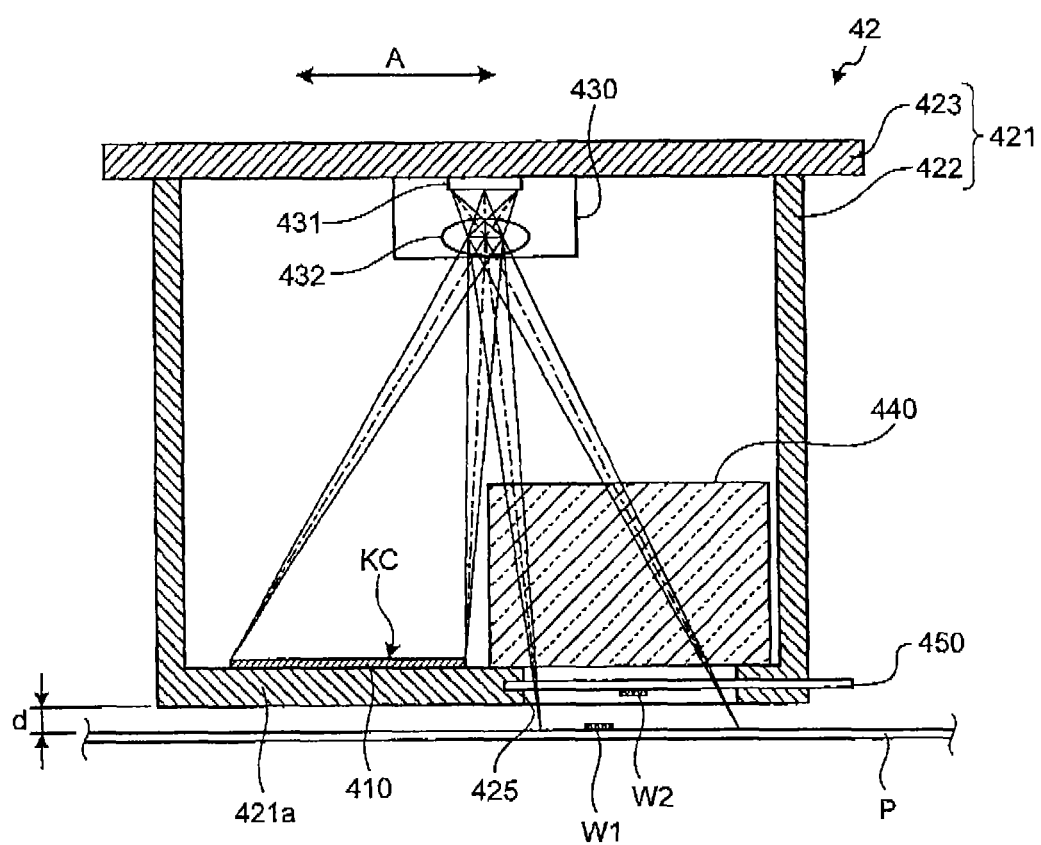
FIG. 16 is a diagram illustrating a condition in which a contamination is deposited on an area of a recording medium, the area serving as a subject area, and a contamination is deposited on a mist prevention transmissive member of the image capturing unit.
Figure 17:
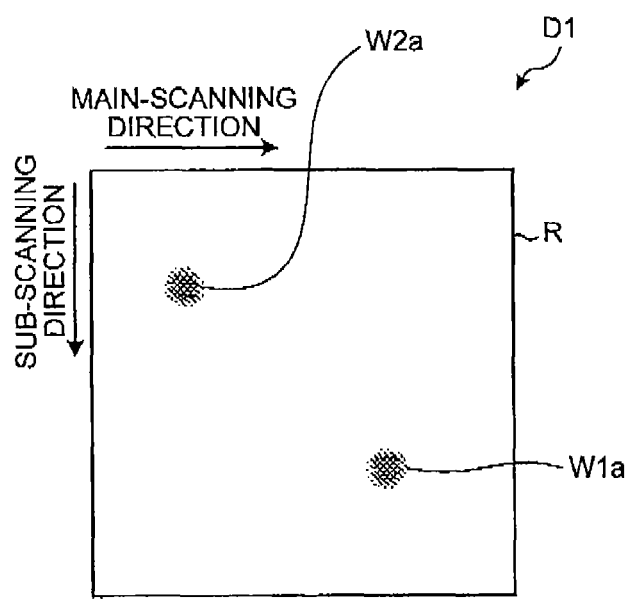
FIG. 17 is a diagram illustrating a first scanned image obtained from image data captured by a sensor unit in the condition illustrated in FIG. 16.

FIG. 16 illustrates a condition in which, in the configuration of the image capturing unit 42 illustrated in FIG. 5A, a contamination W1 is deposited on a subject area (the area facing the opening 425 in the housing 421 of the image capturing unit 42) of the recording medium P placed on the platen 22 and a contamination W2 is deposited on the mist prevention transmissive member 450 of the image capturing unit 42. FIG. 17 is an exemplary diagram illustrating an image of a subject area R (the image of the subject area R will hereinafter be referred to as the "scanned image"), the scanned image having undergone required image processing performed on the image data captured by the sensor unit 430 in the condition illustrated in FIG. 16. FIG. 17 illustrates a first scanned image D1 (the first image) obtained when the housing 421 of the image capturing unit 42 is located at the first position in the optical axis direction of the sensor unit 430. It is noted that, for sake of an easier description of the processes performed by the contaminated pixel detecting unit 532 and the determining unit 533 in the following, an exemplary case will be described in which the recording medium P on which no color measurement target patch CP is formed is used as the subject. The same processes are, nonetheless, still applicable to a case in which the color measurement target patch CP is the subject.

The subject recording medium P is typically white in color and, if the contamination W1 or W2 is not deposited on the recording medium P or the mist prevention transmissive member 450, the scanned image will be an evenly white image over the entire subject area R. If, however, the recording medium P is contaminated with the contamination W1 or the mist prevention transmissive member 450 is contaminated with the contamination W2, a contamination W1a is imaged at a position corresponding to a position of the contamination W1 in the subject area R and a contamination W2a is imaged at a position corresponding to a position of the contamination W2, resulting in a change in the scanned image appearing. The contaminated pixel detecting unit 532 detects pixels that constitute the contaminations W1a, W2a appearing in the scanned image as contaminated pixels.

The scanned image that is to be subjected to the detection of the contaminated pixel by the contaminated pixel detecting unit 532 may be an image of one frame captured by the sensor unit 430 of the image capturing unit 42 or an image obtained by averaging (or weighted averaging) a plurality of frames captured by the sensor unit 430 for each pixel. When an image obtained by averaging a plurality of frames for each pixel is used as the scanned image, an effect of reduced random noise is yielded. Additionally, the scanned image may be a color image (RGB data) obtained through image capturing by the sensor unit 430 or a color image converted to a monochrome image. The conversion from the color image to the monochrome image may be performed by, for example, the image format conversion unit 455 of the data processing section 45. While the color to monochrome conversion may commonly be performed by using the conversion formula of (R+G+B)/3, other methods may be employed. Converting the scanned image to the monochrome image lightens loads in subsequent processes.

The contaminated pixel detecting unit 532 calculates an average value D1_ave of a pixel value in the entire subject area R of the first scanned image D1 as illustrated in FIG. 17. Then, for the first scanned image D1, the contaminated pixel detecting unit 532 calculates a difference between each pixel value and the average value D1_ave. The contaminated pixel detecting unit 532 detects, as a contaminated pixel, a pixel having an absolute value of the calculated difference being equal to or more than a predetermined threshold α. Information on the position of the contaminated pixel (e.g., coordinates of the contaminated pixel in the first scanned image D1) detected by the contaminated pixel detecting unit 532 is stored in the nonvolatile memory 56.

Figure 18A:
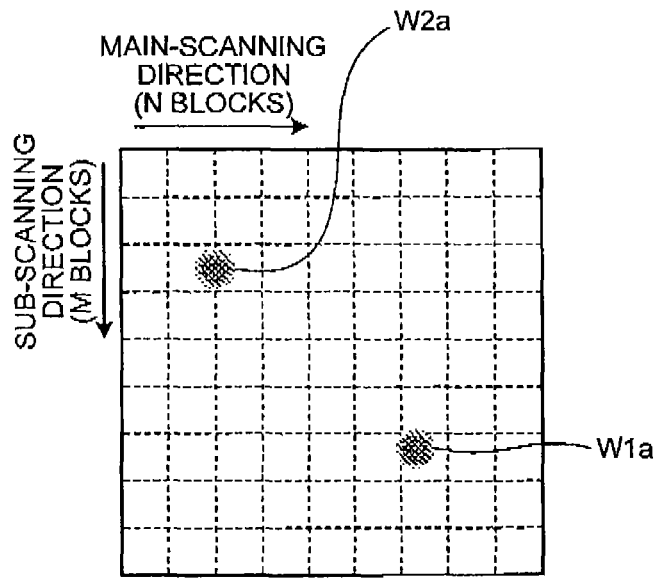
FIGS. 18A and 18B are diagrams illustrating how a contaminated pixel detecting unit determines a contaminated block for the first scanned image illustrated in FIG. 17.
Figure 18B:
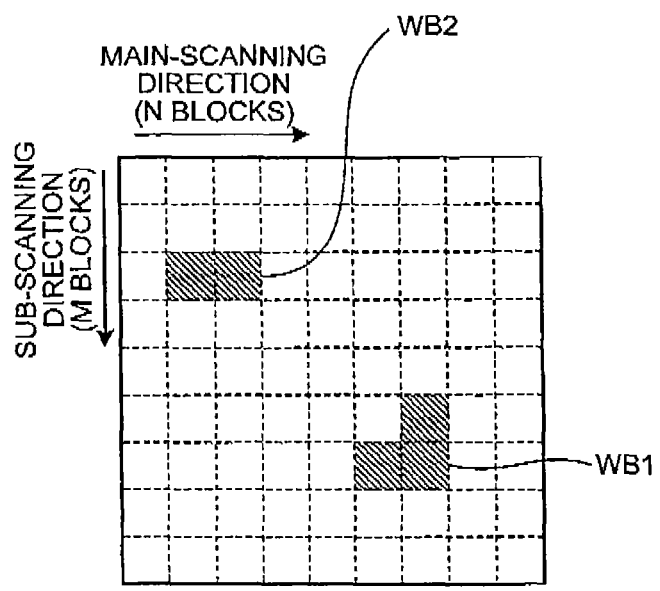

The contaminated pixel detecting unit 532 divides the entire subject area R of the first scanned image D1 into N (main-scanning direction) by M (sub-scanning direction) blocks. Then, the contaminated pixel detecting unit 532 calculates how many contaminated pixels are contained in each block. If the number of contaminated pixels is equal to or more than a predetermined threshold β, the contaminated pixel detecting unit 532 determines a block containing therein that specific number of contaminated pixels to be a contaminated block. Information on the position of the block determined by the contaminated pixel detecting unit 532 to be a contaminated block (e.g., coordinates of a representative point in the contaminated block in the first scanned image D1) is stored in the nonvolatile memory 56 together with the position information of the contaminated pixel. It is noted that any block containing the number of contaminated pixels falling short of the threshold β is determined to be a contamination-free block or a block containing the number of contaminated pixels that does not affect the color measurement. FIGS. 18A and 18B are diagrams illustrating how the contaminated pixel detecting unit 532 determines a contaminated block of the first scanned image D1 illustrated in FIG. 17. The blocks in which the contaminations W1a and W2a are imaged as illustrated in FIG. 18A are determined to be contaminated blocks WB1 and WB2 as illustrated in FIG. 18B. For convenience sake, the description that follows assumes that the scanned image is a monochrome image. The contaminated block can still be determined through the similar process even with the scanned image being an RGB color image. Specifically, if the scanned image is a color image, each of the RGB colors is subjected to the similar process and, if there is any block in which the number of contaminated pixels in any of the colors is equal to or more than the threshold β, that particular block is determined to be a contaminated block.

When the detection of the contaminated pixel and the determination of the contaminated block are completed for the first scanned image D1, the host CPU 107 directs the gap adjusting unit 52 to generate a motor driving signal, and the carriage elevating motor 30 is operated according to the motor driving signal. The carriage 5 and the image capturing unit 42 fixedly disposed at the carriage 5 are then moved in a direction of being spaced away from the recording medium P placed as a subject on the platen 22. The position of the housing 421 of the image capturing unit 42 is then changed to the second position that is spaced farther away in the optical axis direction of the sensor unit 430 from the subject than the position of the housing 421, during the acquisition of the first scanned image D1. Under the foregoing condition, the sensor unit 430 performs image capturing with the same recording medium P as that used during the image capturing of the first scanned image D1 used as the subject. This obtains a second scanned image D2 (the second image).

Figure 19:
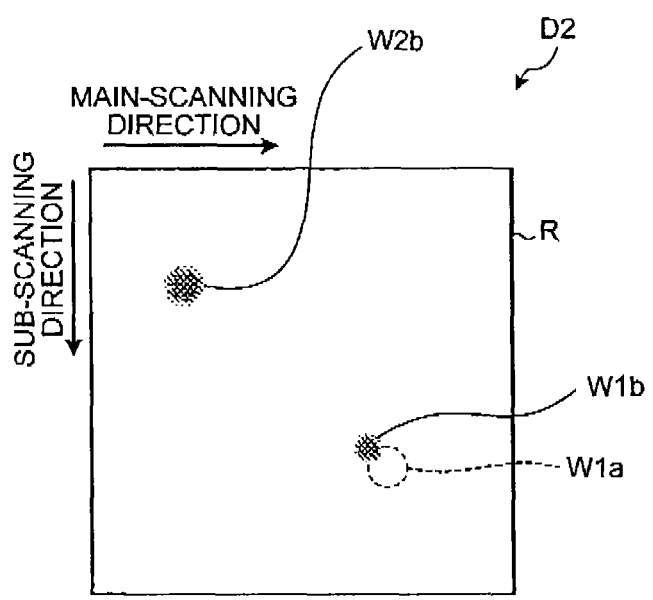
FIG. 19 is a diagram illustrating a second scanned image obtained from the image data captured by the sensor unit.

FIG. 19 is a diagram illustrating the second scanned image D2 obtained from the image data captured by the sensor unit 430 after the housing 421 of the image capturing unit 42 is moved to the second position. With the second scanned image D2 obtained, the contaminated pixel detecting unit 532 detects the contaminated pixel and determines the contaminated block for the second scanned image D2, as with the first scanned image D1. Information on positions of the contaminated pixel and of the contaminated block is stored in the nonvolatile memory 56. In the description given above, the detection of the contaminated pixel is followed by the determination of the contaminated block. The detection of the contaminated pixel and the determination of the contaminated block may, nonetheless, be performed jointly with each other. Specifically, after the scanned image has been divided into N-by-M blocks, a contaminated pixel is detected for each block and any block having the number of detected contaminated pixels being the threshold β or more may be determined to be a contaminated block.

During the acquisition of the second scanned image D2, the housing 421 of the image capturing unit 42 moves from the first position to the second position with a resultant change in the optical path length between the sensor unit 430 and the recording medium P. Thus, as illustrated in FIG. 19, a contamination W1b on the second scanned image D2 corresponding to the contamination W1 on the recording medium P changes in position and size in the subject area R relative to the contamination W1a (indicated by a broken line in FIG. 19) on the first scanned image D1. In contrast, a contamination W2b on the second scanned image D2 corresponding to the contamination W2 on the mist prevention transmissive member 450 does not change in position or size in the subject area R, because the movement of the housing 421 of the image capturing unit 42 from the first position to the second position does not change the optical path length between the sensor unit 430 and the mist prevention transmissive member 450. Consequently, observation of a difference between the first scanned image D1 and the second scanned image D2 allows a determination to be made as to whether the contaminations imaged in the first scanned image D1 and the second scanned image D2 are a contamination on the recording medium P or a contamination on the mist prevention transmissive member 450.

Figure 20A:
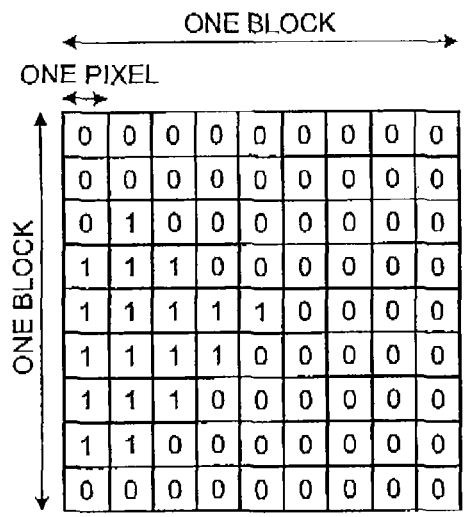
FIGS. 20A, 20B, and 20C are diagrams illustrating specific processes performed by a determining unit.
Figure 20B:
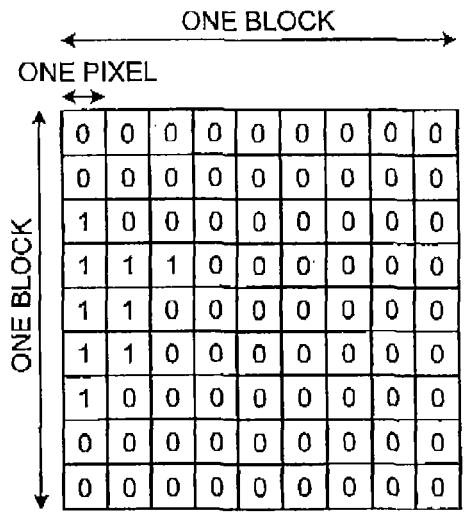
Figure 20C:
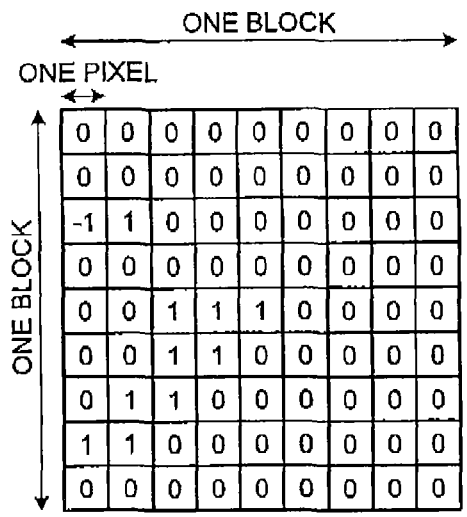

A specific process performed by the determining unit 533 to determine such a contamination will be described below. FIGS. 20A, 20B, and 20C are diagrams illustrating specific processes performed by the determining unit 533. First, based on the information on the position of the contaminated block and on the position of the contaminated pixel stored in the nonvolatile memory 56, the determining unit 533 sets, for each of contaminated blocks of the first scanned image D1, a flag indicating whether each of pixels within the contaminated block is a contaminated pixel. Specifically, the determining unit 533 sets "1" for a contaminated pixel within the contaminated block and "0" for a pixel other than the contaminated pixel within the contaminated block. FIG. 20A illustrates a condition in which "1" is set for the contaminated pixel and "0" is set for the pixel other than the contaminated pixel for a contaminated block within the first scanned image D1.

Based on the information on the position of the contaminated block and on the position of the contaminated pixel stored in the nonvolatile memory 56, the determining unit 533 sets, as with the contaminated block of the first scanned image D1, a flag indicating whether each of pixels within the contaminated block is a contaminated pixel for each of contaminated blocks of the second scanned image D2. Specifically, the determining unit 533 sets "1" for a contaminated pixel within the contaminated block and "0" for a pixel other than the contaminated pixel within the contaminated block. FIG. 20B illustrates a condition in which "1" is set for the contaminated pixel and "0" is set for the pixel other than the contaminated pixel for a contaminated block within the second scanned image D2 corresponding to the contaminated block within the first scanned image D1 illustrated in FIG. 20A.

Next, the determining unit 533 calculates a difference between the value set for each pixel within the contaminated block of the first scanned image D1 and the value set for the corresponding pixel within the contaminated block of the second scanned image D2 to thereby obtain the number of pixels having a value of 1. If the number of pixels having a value of 1 within the contaminated block is less than a threshold γ, the determining unit 533 determines that the contamination W2 of the mist prevention transmissive member 450 is imaged in the contaminated block and that the contamination W2 is deposited on the mist prevention transmissive member 450. If the number of pixels having a value of 1 within the contaminated block is equal to or more than the threshold γ, the determining unit 533 determines that the contamination W1 of the recording medium P is imaged in the contaminated block and that the contamination W1 is deposited on the recording medium P. FIG. 20C represents results of the differences in pixel values between the contaminated block of the first scanned image D1 illustrated in FIG. 20A and the contaminated block of the second scanned image D2 illustrated in FIG. 20B. In the example illustrated in FIG. 20C, the number of pixels having a value of 1 is equal to or more than the threshold γ, the recording medium P is determined to be contaminated with the contamination W1.

The threshold γ used by the determining unit 533 may be a fixed value or set as appropriate with reference to the number of contaminated pixels p(n, m) within each contaminated block D(n, m). If the threshold γ is a fixed value, then the threshold γ needs to be a value equal to or less than the threshold β used by the contaminated pixel detecting unit 532 for determining a contaminated block. If the threshold γ is to be set with reference to the number of contaminated pixels p(n, m) within the contaminated block D(n, m), γ=p(n, m)×F (where, F≤1).

The contaminations W1a, W2a appearing on the first scanned image D1 or the contaminations W1b, W2b appearing on the second scanned image D2 may have a blurred outline as affected by flare, making it difficult at times to detect a contaminated pixel in areas near the boundary. A spatial matrix may then be used to correct the pixel value of each pixel in the first scanned image D1 or the second scanned image D2 to thereby emphasize edges of the contaminations W1a, W2a, W1b, W2b before the contaminated pixel detecting unit 532 detects the contaminated pixel.

Figures 21, 22:
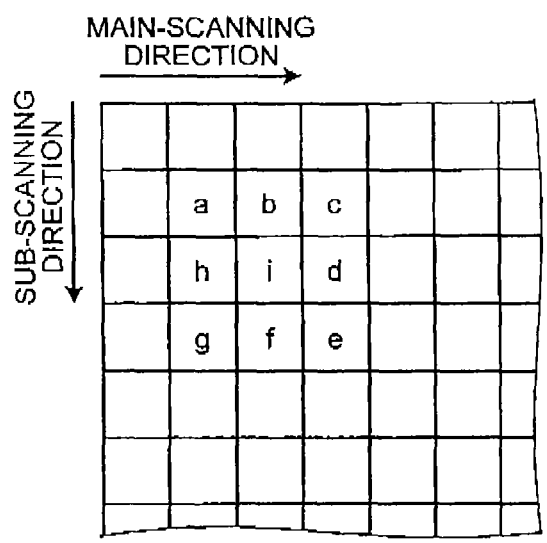
FIG. 21 is a diagram illustrating an overview of a spatial matrix.
FIG. 22 is a diagram illustrating exemplary spatial matrix factors.

FIG. 21 illustrates an overview of the spatial matrix. If the spatial matrix is to be applied to the central pixel denoted "i" in FIG. 21, the pixel value i of the central pixel and pixel values a to h of the pixels surrounding the pixel i are used to correct the pixel value i of the central pixel. FIG. 21 illustrates only an exemplary case in which the pixel values of the 3-by-3 pixels are used for one pixel. A greater or smaller number of pixel values may instead be used for one pixel.

FIG. 22 illustrates exemplary spatial matrix factors. If the spatial matrix factors exemplified in FIG. 22 are used for the pixel value i of the central pixel illustrated in FIG. 21, a pixel value i' that represents a value after the correction of the pixel value i is calculated as follows:

$$i'=9\times i-1\times a-1\times b-1\times c-1\times d-1\times e-1\times f-1\times g-1\times h$$

If the calculation is 0 or less, the pixel value after the correction is 0. If the calculation is 255 (for 8 bits) or more, the pixel value after the correction is 255. Having a large central value of the spatial matrix factors in this manner allows edges of the image to be emphasized. Values of the spatial matrix factors given in FIG. 22 are only examples and any other values may be used. It is also noted that the spatial matrix does not necessarily have a 3-by-3 matrix and an n-by-m matrix may be used depending on applications.

Figure 23A:
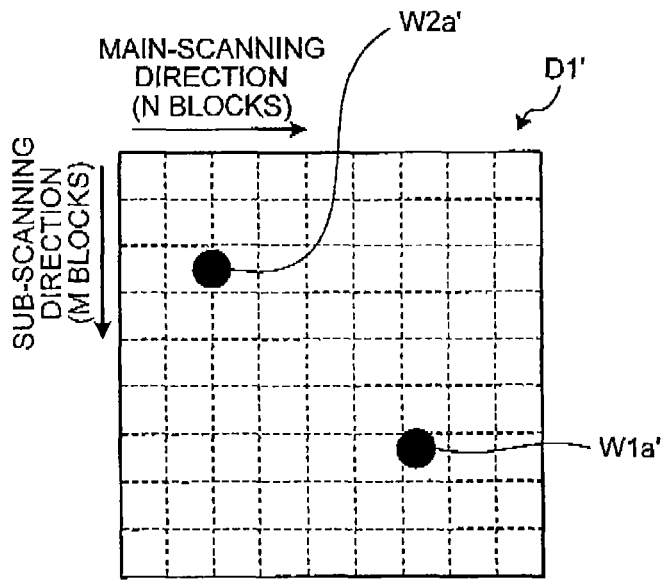
FIGS. 23A and 23B are exemplary scanned images after edges of images are emphasized using the spatial matrix.
Figure 23B:
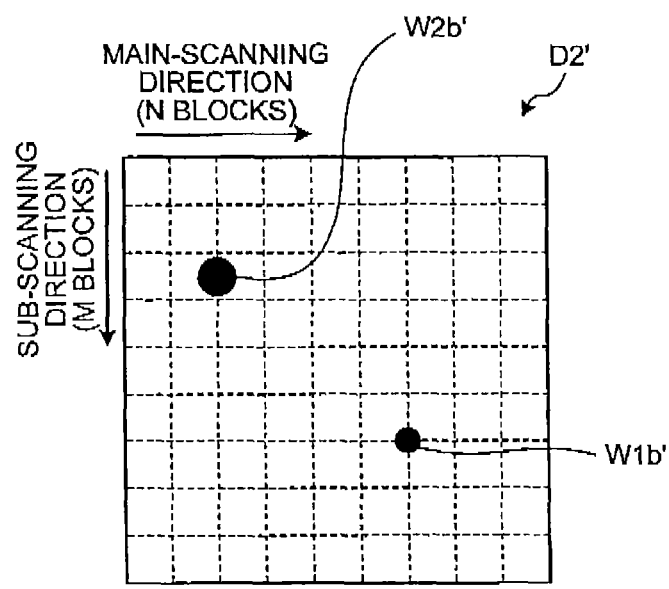

FIGS. 23A and 23B are exemplary scanned images after the edges of the images are emphasized using the spatial matrix. FIG. 23A illustrates an example in which the spatial matrix is applied to the first scanned image D1 illustrated in FIG. 17 and FIG. 18A. FIG. 23B illustrates an example in which the spatial matrix is applied to the second scanned image D2 illustrated in FIG. 19. As illustrated in FIGS. 23A and 23B, correcting the pixel values by applying the spatial matrix to the first scanned image D1 and the second scanned image D2 allows edges of contaminations W1a', W2a', W1b', W2b' that appear on the images to be emphasized. This enables the contaminated pixel detecting unit 532 to detect the contaminated pixel and the determining unit 533 to determine contamination highly accurately. It is noted that the correction of the pixel value of the scanned image using the spatial matrix may be performed at, for example, the data processing section 45 of the image capturing unit 42, the data processing section 45 being configured to have a function of performing a spatial matrix calculation (a spatial matrix calculating module), or at the arithmetic unit 53 of the color measurement control unit 50, the arithmetic unit 53 being configured to have a function of performing a spatial matrix calculation (a spatial matrix calculating module).

Figure 24:
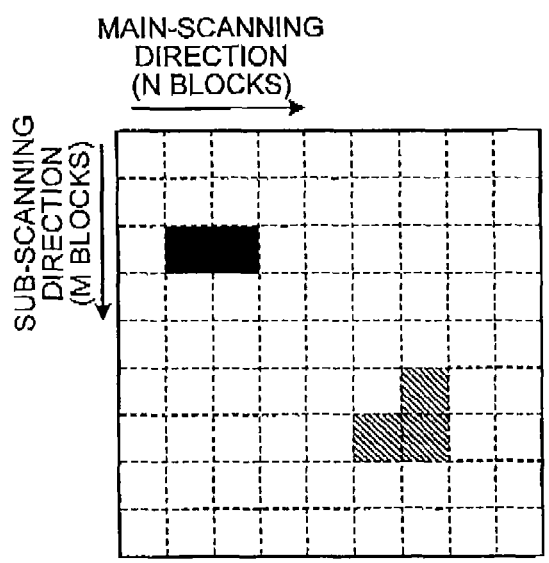
FIG. 24 is a diagram illustrating an exemplary result of a determination of contamination made by the determining unit.

FIG. 24 is a diagram illustrating an exemplary result of a determination of contamination made by the determining unit 533. In FIG. 24, painted blocks are determined to be contaminated blocks of contaminations on the mist prevention transmissive member 450, while crosshatched blocks are determined to be contaminated blocks of contaminations on the recording medium P.

For the contaminated blocks determined to be the contaminations on the mist prevention transmissive member 450, inconvenience of the colorimetric value being changed by the contamination can be prevented by the following method. Specifically, when the image capturing unit 42 images the color measurement target patch CP during the color measurement as part of the adjustments, the host CPU 107 may, for example, read the position information of the blocks in question from the nonvolatile memory 56 and thereby control such that the image data of the blocks in question is not to be used for the color measurement. Alternatively, when the mist prevention transmissive member 450 is determined to be contaminated or when the number of contaminated blocks determined to be those of contaminations on the mist prevention transmissive member 450 exceeds a predetermined threshold φ (1 or more), the user may, for example, be prompted to clean or replace the mist prevention transmissive member 450 under the control of the host CPU 107. In this case, completing the cleaning or replacement of the mist prevention transmissive member 450 resets the position information of the contaminated block stored in the nonvolatile memory 56. For example, the host CPU 107 detects the completion of the cleaning or replacement of the mist prevention transmissive member 450 based on an input operation performed by the user, thereby resetting the position information of the contaminated block stored in the nonvolatile memory 56.

With the contaminated blocks determined to be the contaminations on the recording medium P, for example, the movement of the recording medium P in the sub-scanning direction or the movement of the carriage 5 in the main-scanning direction is controlled according to a command from the host CPU 107 such that the contamination on the recording medium P is deviated from the subject area and the processes by the contaminated pixel detecting unit 532 and the determining unit 533 are to be performed again. Then, under a condition in which the contaminated blocks determined to be the contaminations on the recording medium F do not exist, color measurement is performed on the color measurement target patch CP. Alternatively, if the contaminated blocks determined to be the contaminations on the recording medium P exist, the user may be informed that a contamination is deposited on the recording medium P under the control by the host CPU 107.

Figure 25:
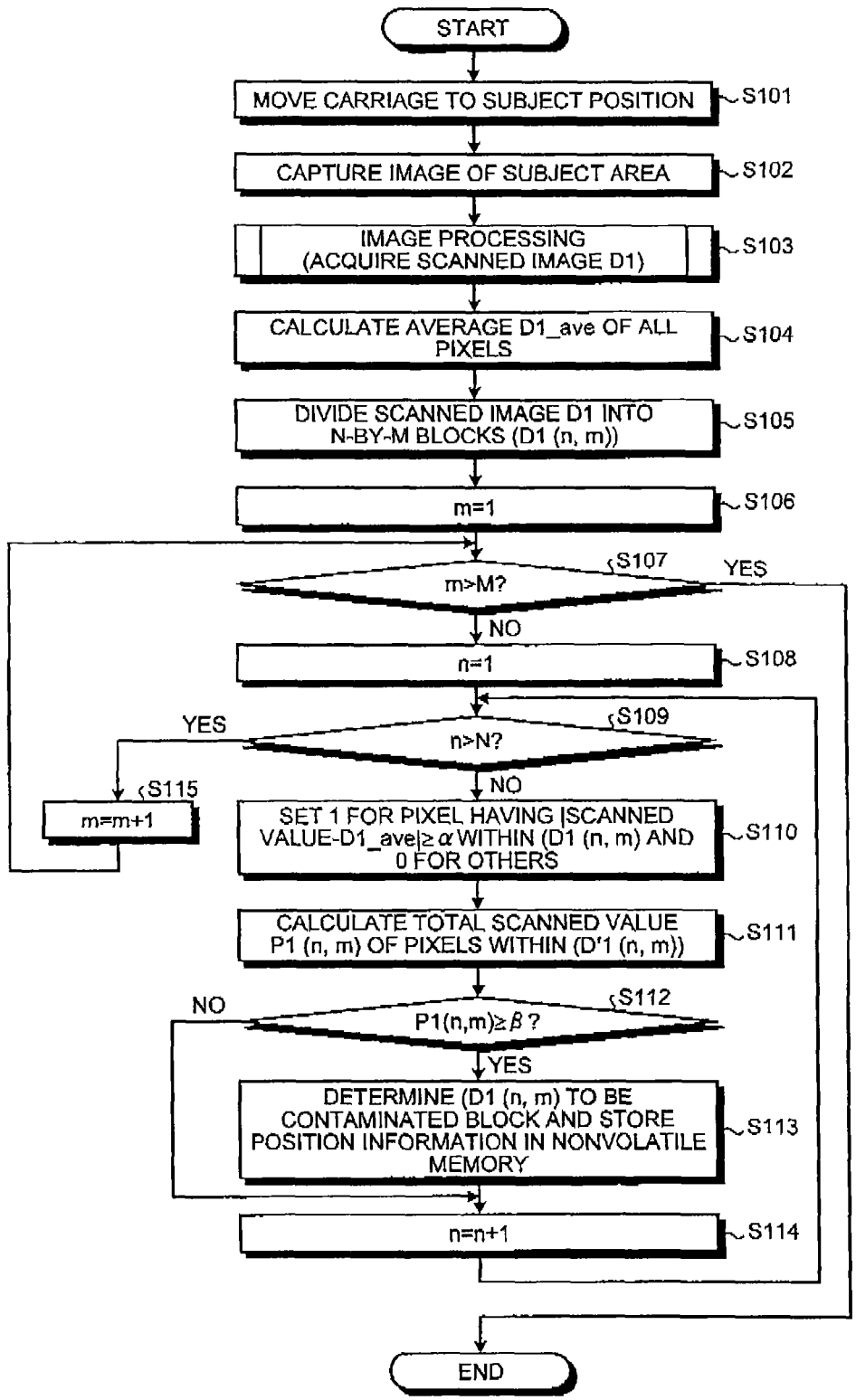
FIG. 25 is a flowchart illustrating a series of steps performed for detecting a contaminated pixel and determining a contaminated block for the first scanned image.

FIG. 25 is a flowchart illustrating a series of steps performed for detecting a contaminated pixel and determining a contaminated block for the first scanned image D1. FIG. 25 illustrates an exemplary process for detecting a contaminated pixel and determining a contaminated block for the first scanned image D1, but alternatively, as described earlier, after the detection of a contaminated pixel and storing of the position information of the contaminated pixel in the nonvolatile memory 56, the first scanned image D1 may be divided into a plurality of blocks and, for each block, the number of contaminated pixels may be compared with the threshold β to thereby determine the contaminated block.

When the process illustrated in FIG. 25 is started, the host CPU 107 first controls the operation of the sheet conveying unit 112 according to a command issued to the sub-scanning driver 113; at the same time, the host CPU 107 controls the movement of the carriage 5 in the main-scanning direction according to a command issued to the main-scanning driver 109, thereby moving the carriage 5 to the position of the subject on the recording medium P (Step S101).

The image capturing unit 42 fixedly disposed at the carriage 5 and located at the first position, at which the image capturing unit 42 faces the recording medium P and maintains the gap d from the recording medium P, captures an image of the subject area (Step S102).

The data processing section 45 performs necessary image processing on the image data output from the sensor unit 430 of the image capturing unit 42, so that the first scanned image D1 is acquired (Step S103). The image processing performed by the data processing section 45 will be described later.

The contaminated pixel detecting unit 532 calculates the average value D1_ave of pixel values of all pixels of the first scanned image D1 acquired at Step S103 (Step S104). The average value D1_ave of the pixel values calculated at this Step is stored in the nonvolatile memory 56 (or the frame memory 51).

Then, the contaminated pixel detecting unit 532 divides the first scanned image D1 acquired at Step S103 into N (main-scanning direction) by M (sub-scanning direction) blocks (Step S105). Hereinafter, the block at a position in the main-scanning direction of n (1≤n≤N) and at a position in the sub-scanning direction of m (1≤m≤M) will be denoted D1 (n, m).

Then, for each of blocks D1 (1, 1) to D1 (N, M) divided at Step S105, the contaminated pixel detecting unit 532 detects a contaminated pixel and determines a contaminated block in sequence (Steps S106 to S115). Specifically, for blocks having 1 for the value of m (Step S106), the contaminated pixel detecting unit 532 repeats performing steps from Step S110 to Step S113, while incrementing the value of n by 1 in sequence up to a value exceeding N (Steps S108, S109, S114). When the value of n exceeds N (Yes at Step S109), the contaminated pixel detecting unit 532 increments the value of m (Step S115) and repeats the foregoing steps. The contaminated pixel detecting unit 532 repeats performing these steps until the value of m exceeds M (Step S107) and, when the value of m exceeds M (Yes at Step S107), terminates the series of steps.

At Step S110, the contaminated pixel detecting unit 532 calculates |pixel value−D1_ave| of each of pixels within D1 (n, m) and detects any pixel having the value of |pixel value−D1_ave| being equal to or more than the threshold α as a contaminated pixel. At this time, "1" is set for a contaminated pixel and "0" is set for any pixel other than the contaminated pixel (pixels having no contamination), whereby the contaminated pixels are represented within D1 (n, m). A block in which "1" is set for the contaminated pixel and "0" is set for any pixel other than the contaminated pixel will hereinafter be denoted D'1 (n, m).

At Step S111, the contaminated pixel detecting unit 532 calculates a total scanned value P1 (n, m) that represents the number of pixels for which "1" is set within D'1 (n, m).

At Step S112, the contaminated pixel detecting unit 532 determines whether P1 (n, m) calculated at Step S111 is equal to or more than the threshold β. If P1 (n, m) is equal to or more than the threshold β (Yes at Step S112), the process proceeds to Step S113. If P1 (n, m) is less than the threshold β (No at Step S112), the process proceeds to Step S114.

At Step S113, the contaminated pixel detecting unit 532 determines D1 (n, m) to be a contaminated block and stores position information (e.g., coordinates of a representative point in the contaminated block in the first scanned image D1) of the contaminated block in question in the nonvolatile memory 56. The position of the contaminated block can be identified through the foregoing process.

In the example described above, the first scanned image D1 is divided into N-by-M blocks. One block may nonetheless be treated as one pixel; specifically, the above process may be performed in units of one pixel. In this case, however, a contaminated block is not to be determined and the position information of the contaminated pixel is stored in the nonvolatile memory 56. Additionally, in the example described above, a pixel of the first scanned image D1 is detected as a contaminated pixel if a difference between its pixel value and the average value D1_ave is equal to or more than the threshold α. Alternatively, a contaminated pixel may be detected through other methods, for example, by simply detecting any pixel having a pixel value exceeding a threshold as a contaminated pixel.

Figure 26:
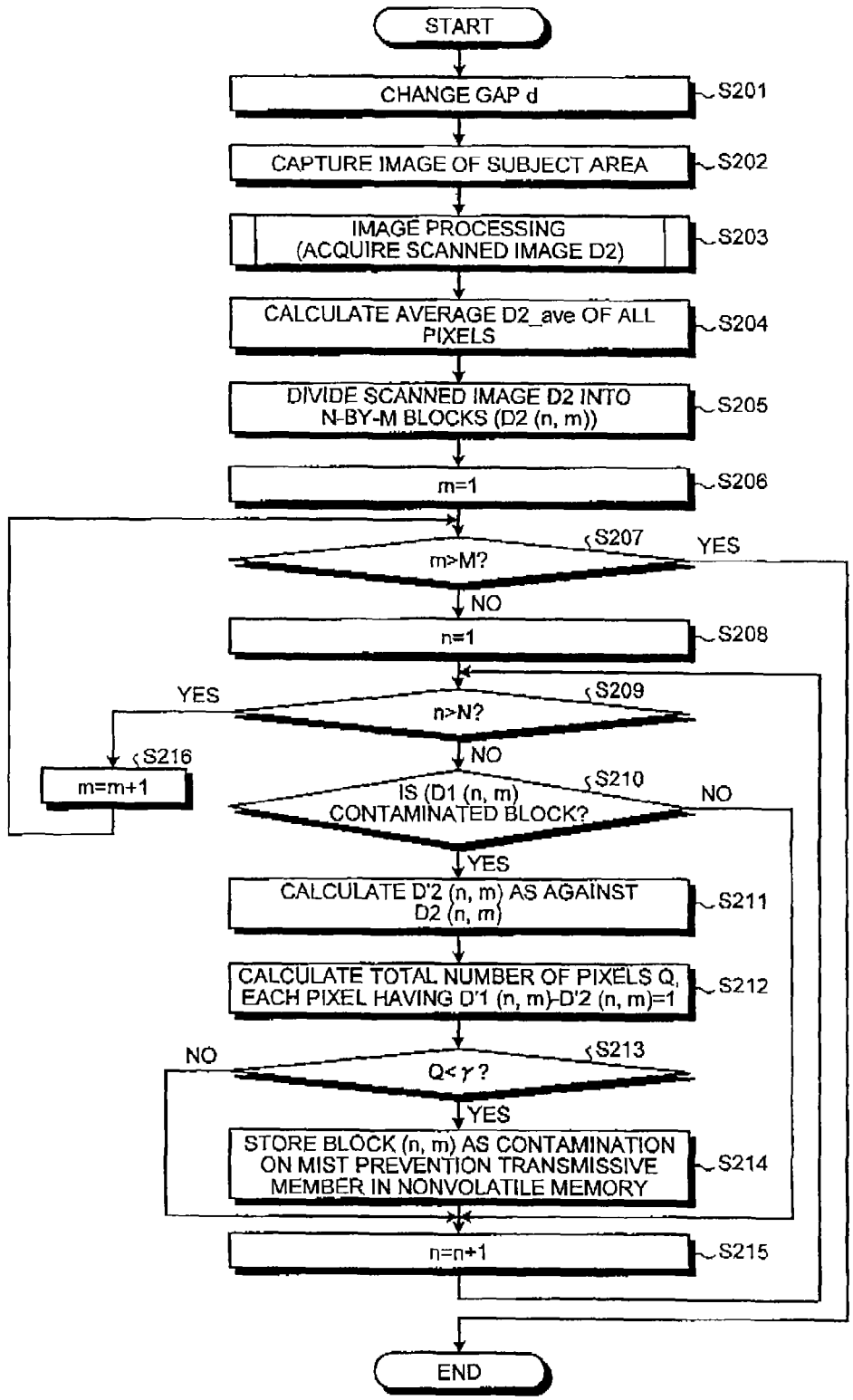
FIG. 26 is a flowchart illustrating a series of steps performed for detecting a contaminated pixel for the second scanned image and determining whether the contamination is a contamination on the mist prevention transmissive member.

FIG. 26 is a flowchart illustrating a series of steps performed for detecting a contaminated pixel for the second scanned image D2 and determining whether the contamination is a contamination on the mist prevention transmissive member 450. It is noted that FIG. 26 illustrates an example in which, together with the detection of a contaminated pixel of the second scanned image D2, a determination is made as to whether the contamination is a contamination on the mist prevention transmissive member 450. But alternatively, as described earlier, after determination of a contaminated block of the second scanned image D2 and storing of the position information of the contaminated block in the nonvolatile memory 56, a difference in the contaminated pixel in the contaminated block at a corresponding position between the first scanned image D1 and the second scanned image D2 and then whether the contamination is a contamination on the mist prevention transmissive member 450 may be determined.

When the process illustrated in FIG. 26 is started, the gap adjusting unit 52 supplies the carriage elevating motor 30 with a motor driving signal under the control of the host CPU 107, thereby moving the carriage 5 and the image capturing unit 42 in a direction of being spaced away from the recording medium P. As a result, the gap d between the image capturing unit 42 and the recording medium P is larger than that during acquisition of the first scanned image D1 (Step S201).

Then, the image capturing unit 42 fixedly disposed at the carriage 5 and located at the second position, at which the gap d from the recording medium P is larger than that during acquisition of the first scanned image D1, captures an image of the subject area (Step S202).

Then, the data processing section 45 performs required image processing on the image data output from the sensor unit 430 of the image capturing unit 42, so that the second scanned image D2 is acquired (Step S203). The image processing process performed by the data processing section 45 will be described later.

Then, the contaminated pixel detecting unit 532 calculates an average value D2_ave of pixel values of all pixels of the second scanned image D2 acquired at Step S203 (Step S204). The average value D2_ave of the pixel values calculated at this Step is stored in the nonvolatile memory 56 (or the frame memory 51).

Then, the contaminated pixel detecting unit 532 divides the second scanned image D2 acquired at Step S203 into N (main-scanning direction) by M (sub-scanning direction) blocks (Step S205). Hereinafter, the block at a position in the main-scanning direction of n ($1 \leq n \leq N$) and at a position in the sub-scanning direction of m ($1 \leq m \leq M$) will be denoted D2 (n, m).

Then, among blocks D2 (1, 1) to D2 (N, M) divided at Step S205, for a block corresponding to the block determined to be a contaminated block in the first scanned image D1, the contaminated pixel detecting unit 532 detects a contaminated pixel and determines a contaminated block in sequence (Steps S206 to S216). Specifically, for blocks having 1 for the value of m (Step S206), the contaminated pixel detecting unit 532 repeats performing steps from Step S210 to Step S214, while incrementing the value of n by 1 in sequence up to a value exceeding N (Steps S208, S209, S215). When the value of n exceeds N (Yes at Step S209), the contaminated pixel detecting unit 532 increments the value of m (Step S216) and repeats the foregoing steps. The contaminated pixel detecting unit 532 repeats performing these steps until the value of m exceeds M (Step S207) and, when the value of m exceeds M (Yes at Step S207), terminates the series of steps.

At Step S210, the contaminated pixel detecting unit 532 determines whether D1 (n, m) is a contaminated block. If D1 (n, m) is a contaminated block (Yes at Step S210), the process proceeds to Step S211. If D1 (n, m) is not a contaminated block (No at Step S210), the process proceeds to Step S215.

At Step S211, the contaminated pixel detecting unit 532 calculates |pixel value−D2_ave| for each of pixels within D2 (n, m) and detects any pixel having the value of |pixel value−D2_ave| being equal to or more than the threshold α as a contaminated pixel. At this time, "1" is set for a contaminated pixel and "0" is set for any pixel other than the contaminated pixel (pixels having no contamination), whereby the contaminated pixels are represented within D2 (n, m). A block in which "1" is set for the contaminated pixel and "0" is set for any pixel other than the contaminated pixel will hereinafter be denoted D'2 (n, m).

At Step S212, the determining unit 533 calculates a difference between D'1 (n, m) and D'2 (n, m) and calculates the total number of pixels Q having a difference of "1". Specifically, for each corresponding pixel between D'1 (n, m) and D'2 (n, m), the determining unit 533 calculates a difference between a value of "1" or "0" set in D'1 (n, m) and a value of "1" or "0" set in D'2 (n, m) and calculates the total number of pixels having the difference of "1", specifically, the total number of pixels Q.

At Step S213, the determining unit 533 determines whether the total number of pixels Q calculated at Step S212 is less than the threshold γ. If the total number of pixels Q is less than the threshold γ (Yes at Step S213), the process proceeds to Step S214. If the total number of pixels Q is equal to or more than the threshold γ (No at Step S213), the process proceeds to Step S215.

At Step S214, the determining unit 533 determines that the contamination appearing in D1 (n, m) and the D2 (n, m) is a contamination on the mist prevention transmissive member 450. The determining unit 533 then stores in the nonvolatile memory 56 information indicating that the cause of the contaminated block in question is in the contamination on the mist prevention transmissive member 450, together with the position information of the contaminated block in question.

Figure 27:
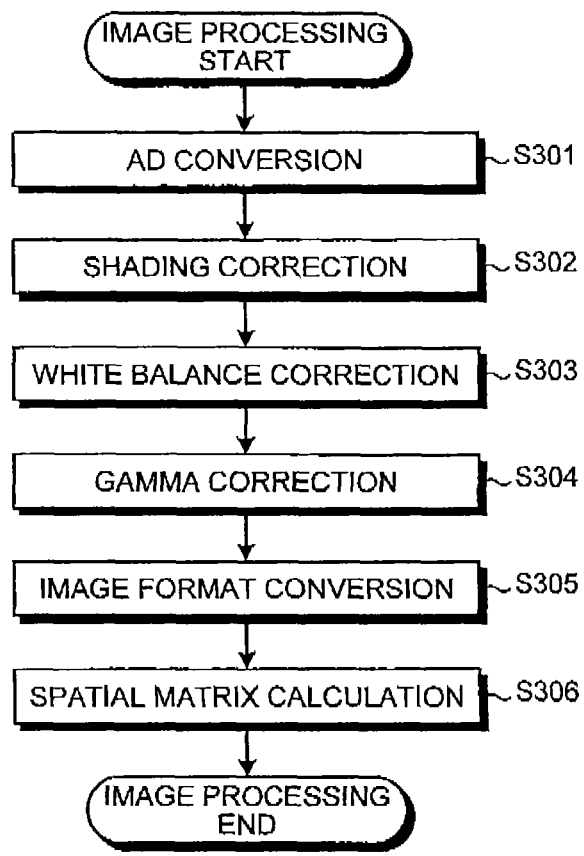
FIG. 27 is a flowchart illustrating image processing steps performed by a data processing section.

FIG. 27 is a flowchart illustrating image processing steps performed by the data processing section 45 at Step S103 of FIG. 25 and Step S203 of FIG. 26. It is noted that FIG. 27 illustrates the image processing steps performed in which the spatial matrix is applied to the first scanned image D1 or the second scanned image D2. If the spatial matrix is not to be used, Step S306 is omitted.

When the image capturing unit 42 captures an image of the subject area and the sensor unit 430 inputs analog signal image data to the data processing section 45, the AD conversion unit 451 of the data processing section 45 converts the input analog signal to a corresponding digital signal (Step S301).

The shading correction unit 452 then performs shading correction on the image data that has been AD converted at Step S301 so as to correct an error in the image data arising from unevenness in the illumination provided by the illumination light source 426 (Step S302).

The white balance correction unit 453 performs white balance correction on the image data that has been subjected to the shading correction at Step S302 (Step S303).

The gamma correction unit 454 performs gamma correction on the image data that has been subjected to the white balance correction at Step S303 so as to compensate for the linearity in the sensitivity of the sensor unit 430 (Step S304).

The image format conversion unit 455 converts the image data that has been subjected to the gamma correction at Step S304 to any given format (Step S305).

The spatial matrix calculating module performs a spatial matrix calculation that corrects the pixel value using the spatial matrix on the image data that has been subjected to the image format conversion at Step S305 (Step S306). It is noted that the spatial matrix calculation may be performed before the image format conversion of Step S305. Alternatively, the spatial matrix calculation may still be performed at the arithmetic unit 53 of the color measurement control unit 50.

Modifications of the Image Capturing Unit

Modifications of the image capturing unit 42 will now be described. In the description that follows, the image capturing unit 42 in each of first to sixth modifications will be denoted as follows: an image capturing unit 42A in the first modification, an image capturing unit 42B in the second modification, an image capturing unit 42C in the third modification, an image capturing unit 42D in the fourth modification, an image capturing unit 42E in the fifth modification, and an image capturing unit 42F in the sixth modification. In these modifications, components common to the image capturing unit 42 of the present embodiment described above are represented by similar reference numerals and an overlapping explanation thereof will be omitted.

First Modification

Figure 28:
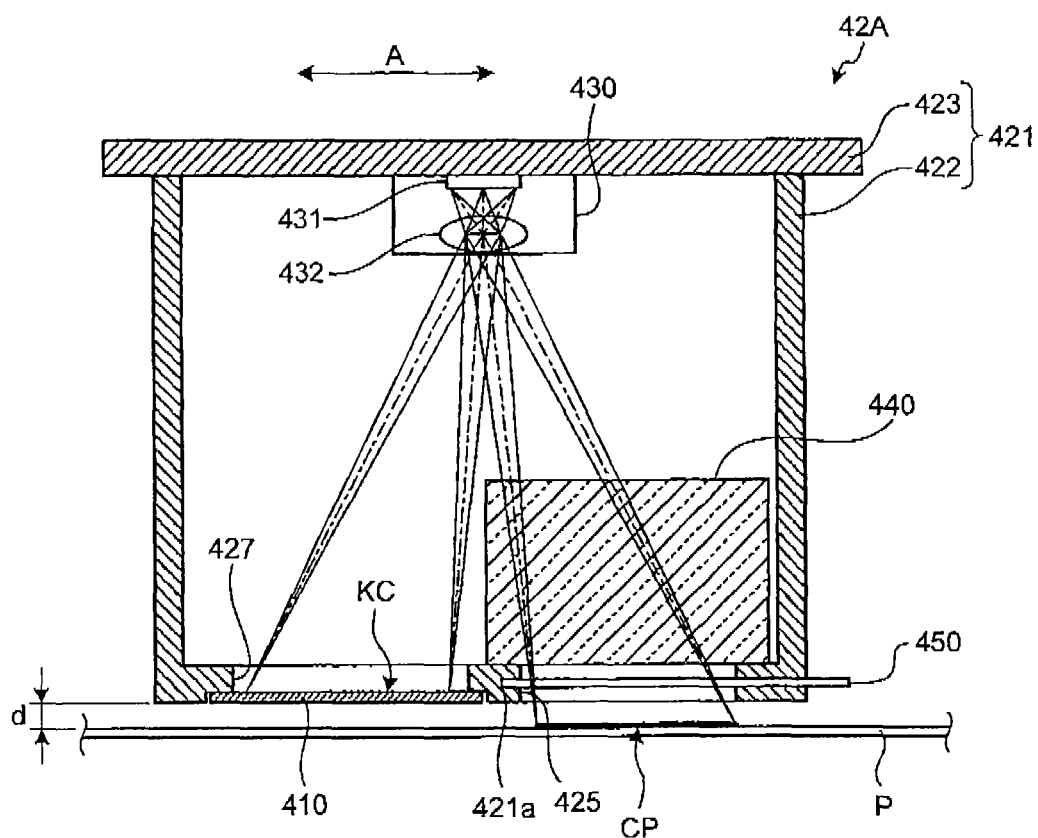
FIG. 28 is a longitudinal cross-sectional view illustrating an image capturing unit in a first modification.

FIG. 28 is a longitudinal cross-sectional view illustrating the image capturing unit 42A in the first modification, comparable in position to the image capturing unit 42 illustrated in FIG. 5A.

In the image capturing unit 42A of the first modification, the bottom surface 421a of the housing 421 has an opening 427, in addition to the opening 425 for capturing an image of a color measurement target patch CP. In addition, the chart plate 410 is disposed so as to close the opening 427 from the outside of the housing 421. Specifically, whereas the chart plate 410 is disposed on the inside of the bottom surface 421a of the housing 421, the inside of the bottom surface 421a facing the sensor unit 430, in the image capturing unit 42 described earlier, the chart plate 410 in the image capturing unit 42A of the first modification is disposed on the outside of the bottom surface 421a of the housing 421, the outside of the bottom surface 421a facing the recording medium P.

More specifically, for example, the bottom surface 421a of the housing 421 has a recess formed on the outside. The recess having a depth corresponding to a thickness of the chart plate 410 is formed so as to communicate with the opening 427. The chart plate 410 is disposed in the recess such that a surface thereof on which the reference chart KC is formed faces the sensor unit 430. The chart plate 410 has, for example, ends bonded to the bottom surface 421a of the housing 421 at positions near end edges of the opening 427 with an adhesive and is thus integrated with the housing 421.

In the image capturing unit 42A of the first modification having arranged as described above, the chart plate 410 on which the reference chart KC is formed is disposed on the outside of the bottom surface 421a of the housing 421. As compared with the image capturing unit 42 described earlier, a difference between the optical path length from the sensor unit 430 to the color measurement target patch CP and the optical path length from the sensor unit 430 to the reference chart KC can be made smaller.

Second Modification

Figure 29:
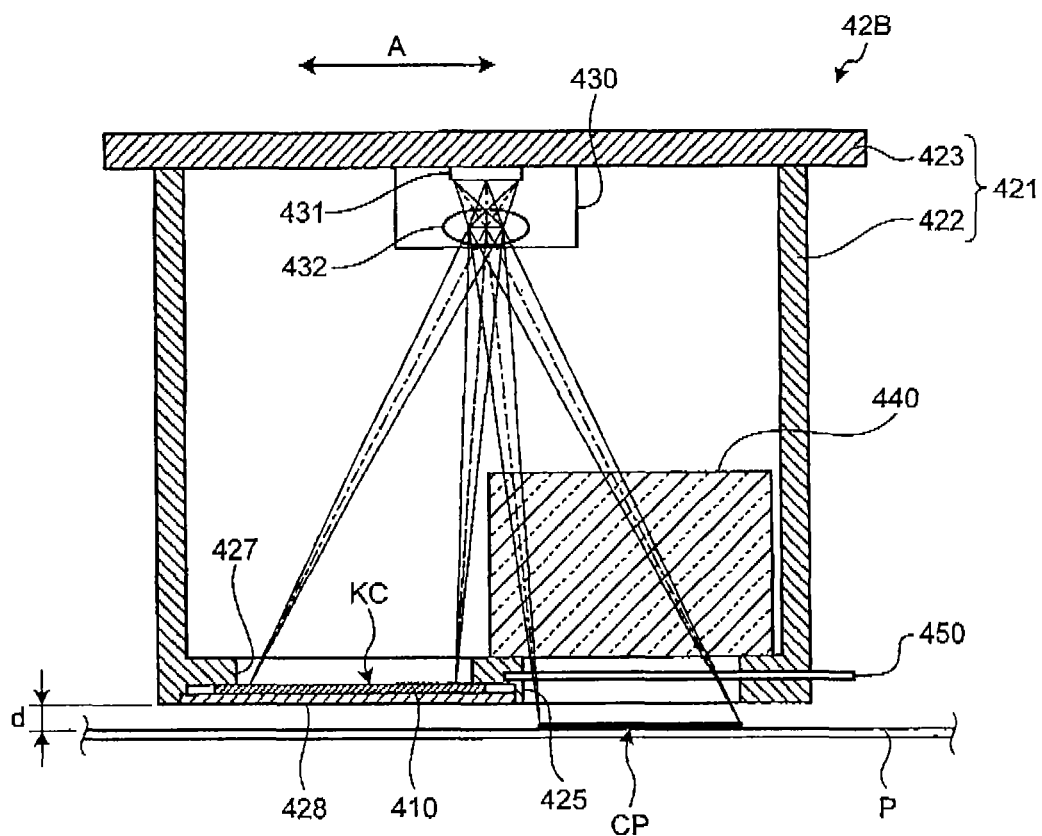
FIG. 29 is a longitudinal cross-sectional view illustrating an image capturing unit in a second modification.

FIG. 29 is a longitudinal cross-sectional view illustrating the image capturing unit 42B in the second modification, comparable in position to the image capturing unit 42 illustrated in FIG. 5A.

In the image capturing unit 42B in the second modification, similarly to the image capturing unit 42A in the first modification, the chart plate 410 is disposed on the outside of the bottom surface 421a of the housing 421. It should, however, be noted that, whereas the chart plate 410 in the image capturing unit 42A in the first modification is bonded to the bottom surface 421a of the housing 421 with, for example, an adhesive so as to be integrated with the housing 421, the chart plate 410 in the image capturing unit 42B in the second modification is held in position removably from the housing 421.

More specifically, for example, similarly to the image capturing unit 42A in the first modification, the bottom surface 421a of the housing 421 has a recess formed on the outside, the recess being formed so as to communicate with an opening 427. The chart plate 410 is disposed in the recess. In addition, the image capturing unit 42B in the second modification includes a holding member 428 that holds in place the chart plate 410 disposed in the recess by pressing the chart plate 410 from the outside of the bottom surface 421a of the housing 421. The holding member 428 is removably mounted on the bottom surface 421a of the housing 421. Consequently, in the image capturing unit 42B in the second modification, the chart plate 410 can be removed by removing the holding member 428 from the bottom surface 421a of the housing 421.

As described above, in the image capturing unit 42B in the second modification, the chart plate 410 removably held in place relative to the housing 421 can be removed. This arrangement allows the chart plate 410, should it be deteriorated due to, for example, a contamination on the reference chart KC, to be replaced with a new one with ease. Additionally, when the above-described shading correction unit 452 attempts to acquire shading data for correcting unevenness in the illumination provided by the illumination light source 426, the chart plate 410 may be removed and a white reference plate disposed in place of the chart plate 410, so that the sensor unit 430 may be able to capture the image of the white reference plate to acquire the shading data easily.

Third Modification

Figure 30:
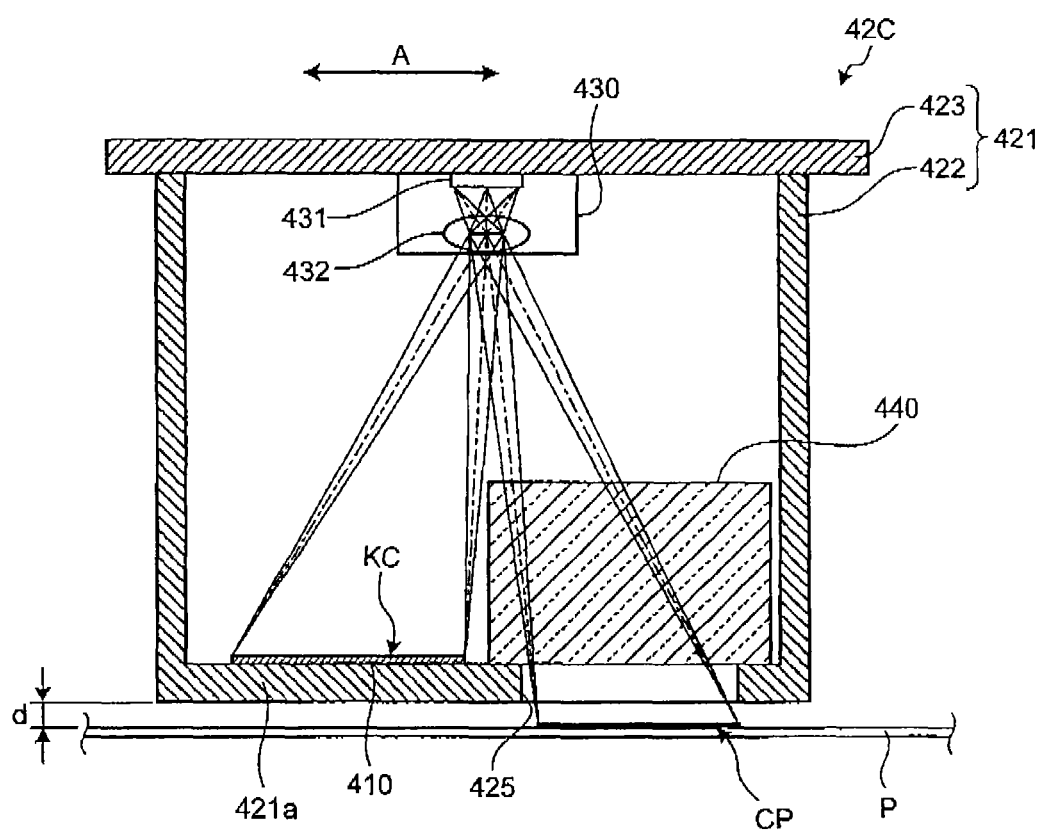
FIG. 30 is a longitudinal cross-sectional view illustrating an image capturing unit in a third modification.

FIG. 30 is a longitudinal cross-sectional view illustrating the image capturing unit 42C in the third modification, comparable in position to the image capturing unit 42 illustrated in FIG. 5A.

The image capturing unit 42C in the third modification eliminates the mist prevention transmissive member 450 that closes the opening 425 in the housing 421 and, instead, uses the optical path length changing member 440 to close the opening 425 in the housing 421.

In the image capturing unit 42C in the third modification, the optical path length changing member 440 closes the opening 425 in the housing 421. This arrangement prevents entry of mist in the inside of the housing 421 in a manner similar to that in the arrangement including the mist prevention transmissive member 450. In the third modification, color measurement of the color measurement target patch CP may be impaired by a contamination on the optical path length changing member 440 due to the mist or dust being deposited on the optical path length changing member 440. In the third modification, therefore, contamination of the optical path length changing member 440, instead of the mist prevention transmissive member 450, is determined through the above-described method.

Fourth Modification

Figure 31:
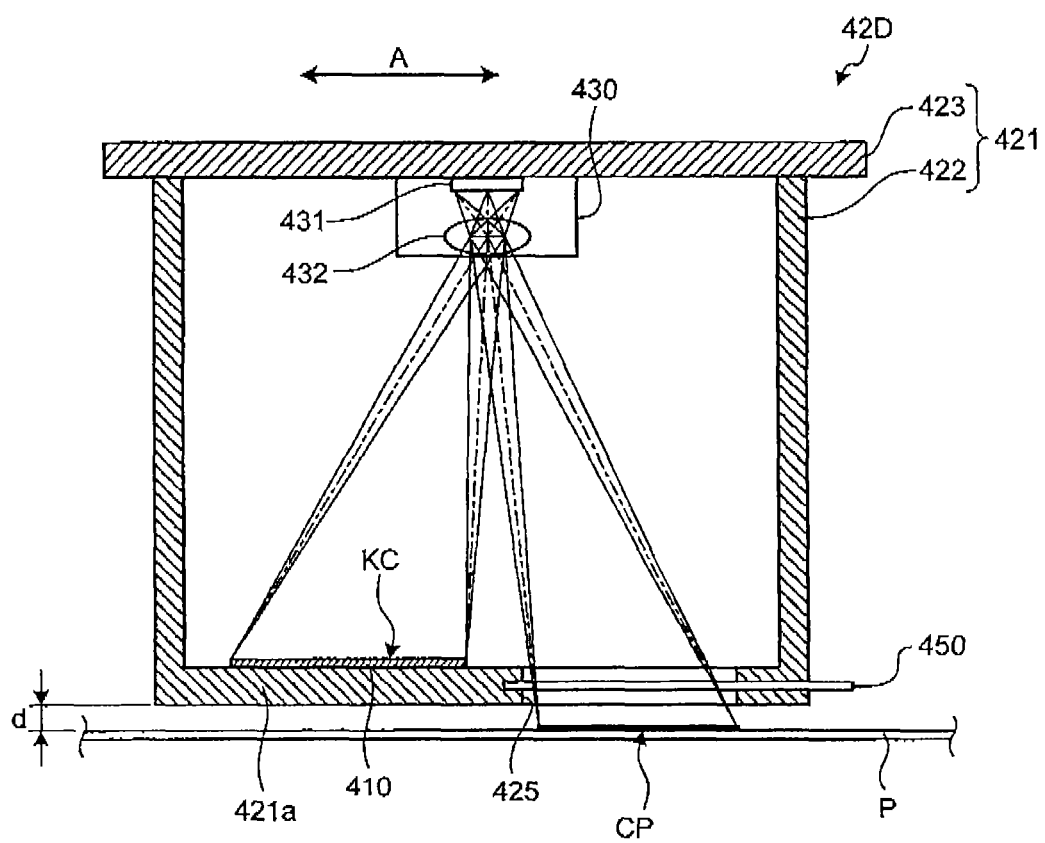
FIG. 31 is a longitudinal cross-sectional view illustrating an image capturing unit in a fourth modification.

FIG. 31 is a longitudinal cross-sectional view illustrating the image capturing unit 42D in the fourth modification, comparable in position to the image capturing unit 42 illustrated in FIG. 5A.

The image capturing unit 42D in the fourth modification eliminates the optical path length changing member 440 inside the housing 421. As described earlier, the optical path length changing member 440 has a function of adjusting the optical path length from the sensor unit 430 to the subject (color measurement target patch CP) to the optical path length from the sensor unit 430 to the reference chart KC. If, however, the difference between these optical path lengths falls within the range of the depth of field of the sensor unit 430, an image that focuses on both the subject (color measurement target patch CP) and the reference chart KC can be captured even with a difference in the optical path lengths.

The difference between the optical path length from the sensor unit 430 to the subject (color measurement target patch CP) and the optical path length from the sensor unit 430 to the reference chart KC is substantially a thickness of the bottom surface 421a of the housing 421 to which the gap d is added. Thus, given a sufficiently small value for the gap d, the difference between the optical path length from the sensor unit 430 to the subject (color measurement target patch CP) and the optical path length from the sensor unit 430 to the reference chart KC can be brought into the range of the depth of field of the sensor unit 430. Reduction in parts cost can thus be achieved by eliminating the optical path length changing member 440.

It is to be noted that the depth of field of the sensor unit 430 is a characteristic unique to the sensor unit 430, established according to, for example, an aperture value of the sensor unit 430, a focal length of the imaging lens 432, and a distance between the sensor unit 430 and the subject. In the image capturing unit 42D in the fourth modification, the sensor unit 430 is designed such that the difference between the optical path length from the sensor unit 430 to the subject (color measurement target patch CP) and the optical path length from the sensor unit 430 to the reference chart KC falls within the range of the depth of field when the gap d between the bottom surface 421a of the housing 421 and the recording medium P is set to a sufficiently small value of, for example, about 1 mm to 2 mm.

Fifth Modification

Figure 32A:
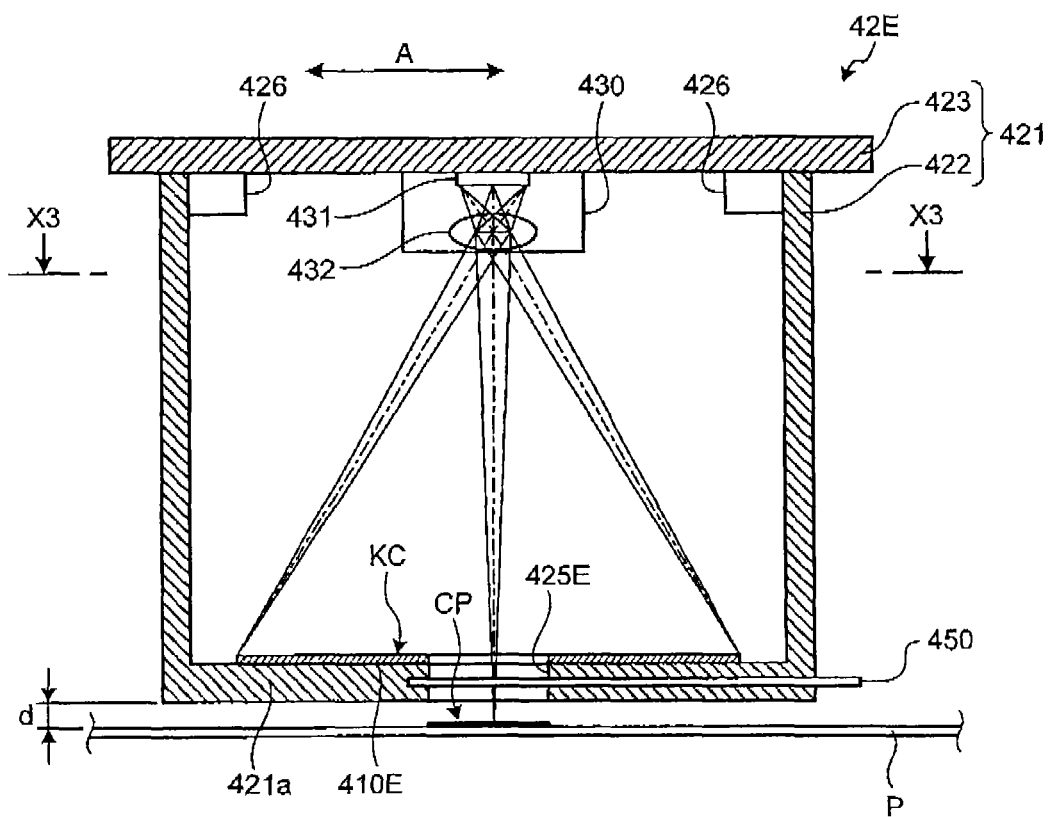
FIG. 32A is a longitudinal cross-sectional view illustrating an image capturing unit in a fifth modification.
Figure 32B:
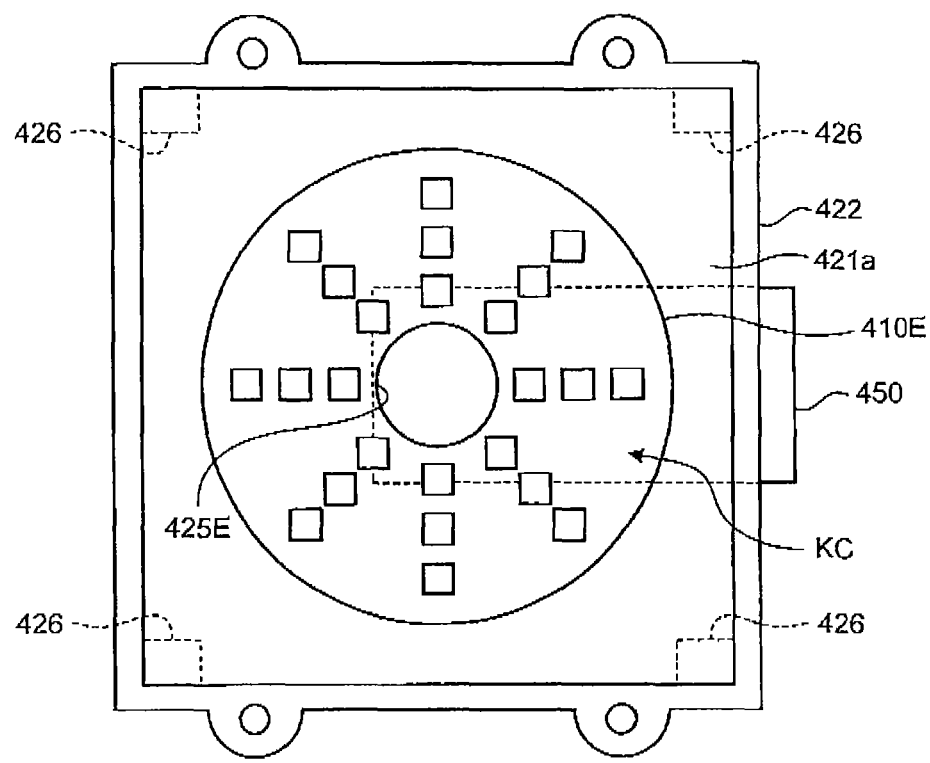
FIG. 32B is a plan view illustrating a bottom surface of a housing in the image capturing unit in the fifth modification as viewed from an X3 direction in FIG. 32A.

FIG. 32A is a longitudinal cross-sectional view illustrating the image capturing unit 42E in the fifth modification, comparable in position to the image capturing unit 42 illustrated in FIG. 5A. FIG. 32B is a plan view illustrating the bottom surface 421a of the housing 421 as viewed from an X3 direction in FIG. 32A. In FIG. 32R, a vertical projected position of the illumination light source 426 on the bottom surface 421a of the housing 421 (the position onto which the illumination light source 426 is projected when looked down vertically relative to the bottom surface 421a) is indicated by a broken line.

The image capturing unit 42E in the fifth modification has an opening 425E at a position on the bottom surface 421a of the housing 421 along a perpendicular line extended perpendicularly from the sensor unit 430 to the bottom surface 421a (specifically, the center of an optical axis of the sensor unit 430). The image of the subject (color measurement target patch CP) is captured through this opening 425E. Specifically, in the image capturing unit 42E in the fifth modification, the opening 425E for capturing an image of the subject (color measurement target patch CP) outside the housing 421 is formed substantially at a center in the imaging range of the sensor unit 430.

In addition, in the image capturing unit 42E in the fifth modification, a chart plate 410E on which the reference chart KC is formed is disposed on the bottom surface 421a of the housing 421 so as to surround the opening 425E. For example, the chart plate 410E may be formed into an annular ring around the opening 425E. The chart plate 410E may be held in place in a condition of being fixed to the housing 421, having a surface opposite to the surface on which the reference chart KC is formed as an adhesive surface bonded with, for example, an adhesive to the inside of the bottom surface 421a of the housing 421.

The image capturing unit 42E in the fifth modification includes four LEDs as the illumination light source 426. The four LEDs are disposed at four corners on the inside of the frame 422 that assumes side walls of the housing 421. The four LEDs used as the illumination light source 426 are mounted, for example, together with the two-dimensional image sensor 431 of the sensor unit 430 on the inner surface of the board 423. Disposing the four LEDs used as the illumination light source 426 in the foregoing manner allows the subject (color measurement target patch CP) and the reference chart KC to be illuminated under a substantially identical condition.

In the image capturing unit 42E in the fifth modification having the arrangements as described above, the opening 425E for capturing the image of the subject (color measurement target patch CP) outside the housing 421 is disposed in the bottom surface 421a of the housing 421 along the perpendicular line extended from the sensor unit 430 and, moreover, the chart plate 410E on which the reference chart KC is formed is disposed so as to surround the opening 425E. The image of the subject (color measurement target patch CP) and the reference chart KC can thus be captured appropriately.

Sixth Modification

Figure 33:
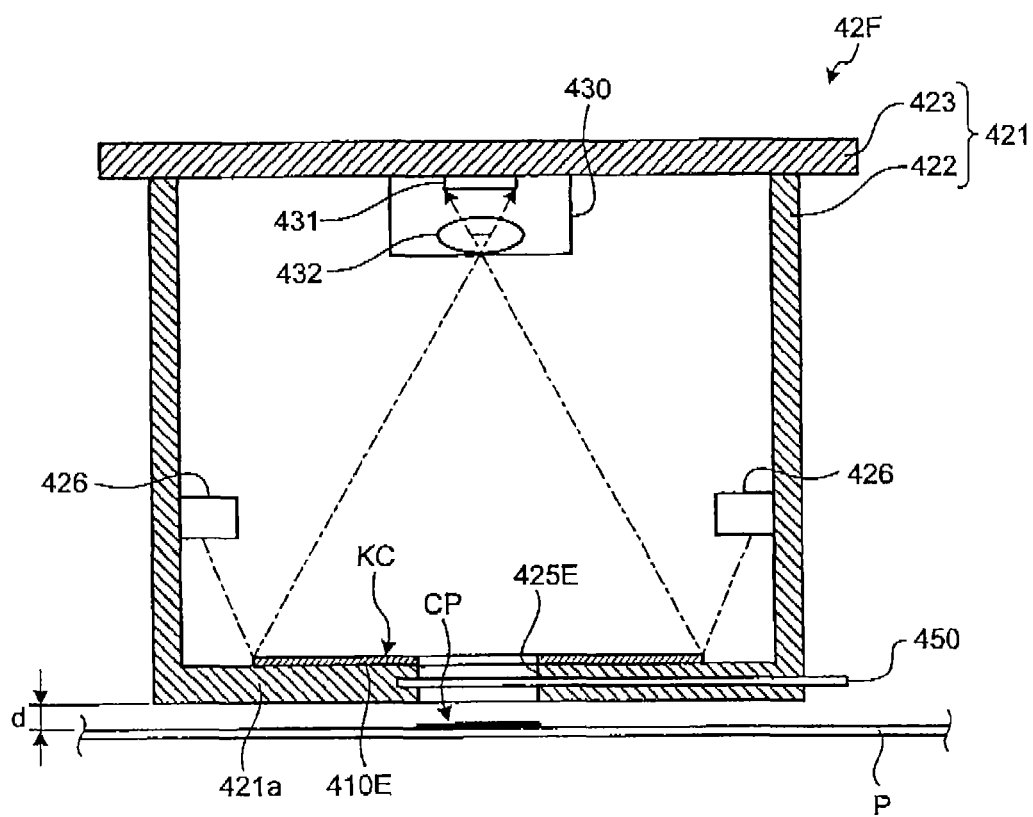
FIG. 33 is a longitudinal cross-sectional view illustrating an image capturing unit in a sixth modification.

FIG. 33 is a longitudinal cross-sectional view illustrating the image capturing unit 42F in the sixth modification, comparable in position to the image capturing unit 42 illustrated in FIG. 5A.

As in the image capturing unit 42E in the fifth modification, the image capturing unit 42F in the sixth modification includes four LEDs as the illumination light source 426. The four LEDs are disposed at four corners on the inside of the frame 422. In the image capturing unit 42F in the sixth modification, however, to prevent light regularly reflected from the subject (color measurement target patch CP) or the reference chart KC from being incident upon the two-dimensional image sensor 431 of the sensor unit 430, the four LEDs used as the illumination light source 426 are disposed at positions closer to the bottom surface 421a of the housing 421 than those in the image capturing unit 42E in the fifth modification.

Due to saturation of the pixel value, accurate information may not be able to be obtained on the position on a sensor surface of the two-dimensional image sensor 431 of the sensor unit 430 upon which the regularly reflected light of the illumination light source 426 is incident. If the illumination light source 426 is disposed at a position at which the light regularly reflected from the subject (color measurement target patch CP) or the reference chart KC is incident upon the two-dimensional image sensor 431 of the sensor unit 430, information required for color measurement of the subject (color measurement target patch CP) may not be able to be obtained. Thus, in the image capturing unit 42F in the sixth modification, as illustrated in FIG. 33, the four LEDs used as the illumination light source 426 are disposed at positions closer to the bottom surface 421a of the housing 421. The light regularly reflected from the subject (color measurement target patch CP) or the reference chart KC is thereby prevented from being incident upon the two-dimensional image sensor 431 of the sensor unit 430. The arrow with a dash-single-dot line in FIG. 33 schematically represents an optical path of the regularly reflected light.

As described above, in the image capturing unit 42F in the sixth modification, the illumination light source 426 is disposed at a position at which the light regularly reflected from the subject (color measurement target patch CP) or the reference chart KC is not incident upon the two-dimensional image sensor 431 of the sensor unit 430. This arrangement effectively prevents saturation of the pixel value at the position on the sensor surface of the two-dimensional image sensor 431 onto which the optical image of the subject (color measurement target patch CP) or the reference chart KC is focused. The image of the subject (color measurement target patch CP) or the reference chart KC can thereby be captured appropriately.

Other Modifications

The image capturing unit 42 according to the present embodiment and its modifications described heretofore are configured such that the reference chart KC is disposed on the housing 421 and the sensor unit 430 is adapted to capture the images of the subject (color measurement target patch CP) and the reference chart KC simultaneously. As described earlier, however, the initial reference RGB values or the color measurement reference RGB values obtained through capturing of the image of the reference chart KC are used, as against the color measurement target RGB values obtained through capturing of the image of the color measurement target patch CP, to eliminate effects from a change with time in the image capturing condition of the image capturing unit 42, for example, a change with time of the illumination light source 426 or of the two-dimensional image sensor 431. Specifically, the initial reference RGB values or the color measurement reference RGB values obtained through capturing of the image of the reference chart KC are used for converting the color measurement target RGB values to the initialization color measurement target RGB values (RsGsBs) by calculating and using the above-described reference RGB linear conversion matrix.

If the change with time in the image capturing condition of the image capturing unit 42 relative to color measurement accuracy requirements is negligible, the image capturing unit 42 configured to include no reference chart KC may be used. If the image capturing unit 42 configured to include no reference chart KC is to be used, the step of converting the color measurement target RGB values obtained by this image capturing unit 42 capturing the image of the color measurement target patch CP to the initialization color measurement target RGB values (Step S10 in FIG. 11) is omitted and the basic color measurement process (Step S20 of FIG. 11, and FIGS. 14 and 15) is performed for the color measurement target RGB values.

The image forming apparatus 100 according to the present embodiment lets the color measurement control unit 50 perform the color measurement process. The color measurement process is not, however, necessarily to be performed within the image forming apparatus 100. For example, an image forming system (color measuring system) may be formed by connecting the image forming apparatus 100 communicatively to an external device that is given the capability of performing the function of the color measurement control unit 50, thereby causing the external device to perform the color measurement process. Specifically, the color measuring system is configured to include the image capturing unit 42 disposed in the image forming apparatus 100, the color measurement control unit 50 disposed in the external device, and a communication unit that connects the image capturing unit 42 and the color measurement control unit 50.

In this case, for example, the image forming apparatus 100 uses the communication unit to transmit image data of the color measurement target patch CP and the reference chart KC captured by the image capturing unit 42 to the external device. The external device calculates a colorimetric value of the color measurement target patch CP using the image data received from the image forming apparatus 100 and, based on the calculated colorimetric value of the color measurement target patch CP, generates a color conversion parameter for improving color reproducibility of the image forming apparatus 100. The external device then transmits the generated color conversion parameter to the image forming apparatus 100 with the communication unit. The image forming apparatus 100 retains the color conversion parameter received from the external device and, when forming an image, corrects image data with the color conversion parameter and generates the image based on the image data that has been corrected. This enables the image forming apparatus 100 to form an image with high color reproducibility.

Alternatively, the external device may retain the color conversion parameter generated based on the colorimetric value of the color measurement target patch CP, so that the external device makes the correction of the image data. Specifically, when forming an image, the image forming apparatus 100 transmits the image data to the external device. The external device uses the color conversion parameter retained therein to correct the image data received from the image forming apparatus 100 and transmits the corrected image data to the image forming apparatus 100. The image forming apparatus 100 forms the image based on the image data after the correction received from the external device. This enables the image forming apparatus 100 to form an image with high color reproducibility.

As described heretofore in detail with the specific examples, the image capturing unit 42 of the present embodiment uses the sensor unit 430 disposed inside the housing 421 to capture the image of the subject disposed on the outside of the housing 421 and illuminated evenly by the illumination light source 426 through the opening 425 in the housing 421. Additionally, the image capturing unit 42 of the present embodiment covers the opening 425 in the housing 421 for capturing the image of the subject outside the housing 421 with the mist prevention transmissive member 450 to thereby prevent entry of mist in the inside of the housing 421 and determines as necessary whether a contamination is deposited on the mist prevention transmissive member 450. The image capturing unit 42 can thus perform stable image capturing by reducing fluctuations in various image capturing conditions. The image capturing unit 42 can also effectively prevent inconvenience in which a contamination on the mist prevention transmissive member 450 disrupts the color measurement process performed using the image captured by the image capturing unit 42.

The image forming apparatus 100 according to the present embodiment includes the image capturing unit 42 of the present embodiment and the color measuring device incorporating the same. The image forming apparatus 100 can therefore produce an image with high quality by outputting a color measurement target image, accurately performing color measurement of the image, and appropriately adjusting output characteristics.

The present embodiment has been described that: the contaminated pixel detecting unit 532 divides the entire subject area R of the first scanned image D1 into N (main-scanning direction) by M (sub-scanning direction) blocks; then, the contaminated pixel detecting unit 532 calculates how many contaminated pixels are contained in each block; and, if the number of contaminated pixels is equal to or more than the predetermined threshold β, the contaminated pixel detecting unit 532 determines a block containing therein that specific number of contaminated pixels to be a contaminated block. However, instead of dividing the entire subject area R of the first scanned image D1 into a plurality of blocks, the contaminated pixel detecting unit 532 may calculate the number of contaminated pixels of the entire sensor unit 430. The contaminated pixel detecting unit 532 may then determine a block containing therein the calculated number of contaminated pixels exceeding the predetermined threshold β to be a contaminated block.

In the above-described present embodiment, the determining unit 533 finds, for each pixel, a difference between a value of "1" or "0" set in D'1 (n, m) and a value of "1" or "0" set in D'2 (n, m) and calculates the total number of pixels having the difference of "1", specifically, the total number of pixels Q. The determining unit 533 may nonetheless calculates as the total number of pixels Q a difference between the number of contaminated pixels of the entire first scanned image D1 and the number of contaminated pixels of the entire second scanned image D2.

The control function of each of different components constituting the image forming apparatus 100 or the color measuring device according to the present embodiment described above may be achieved using hardware, software, or a combination of the hardware and the software. If the control function of each of the different components constituting the image forming apparatus 100 or the color measuring device according to the present embodiment described above is to be achieved with the software, a processor of the image forming apparatus 100 or the color measuring device executes a computer program that describes a processing sequence. The program to be executed by the processor may be provided by, for example, being incorporated in advance in a read only memory (ROM) inside the image forming apparatus 100 or the color measuring device. The program to be executed by the processor may still be provided by being recorded on a computer-readable recording medium, such as a compact disc read-only memory (CD-ROM), a flexible disk (FD), a compact disc recordable (CD-R), and a digital versatile disk (DVD), in a file in an installable format or an executable format.

The program to be executed by the processor may also be configured so as to be stored in a computer connected to a network such as the Internet and to be downloaded over the network. The program to be executed by the processor may still be configured so as to be provided or distributed over a network such as the Internet.

According to the present invention, stable image capturing can be performed by reducing fluctuations in image capturing conditions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing device comprising:
    an image capturing unit that includes:
        an optical transmission member disposed on a surface facing a subject; and
        a sensor unit that captures an image of the subject via the optical transmission member;
    a moving unit that moves the image capturing unit in an optical axis direction of the sensor unit;
    a detector that detects a contamination from each of a first image and a second image, the first image being captured by the sensor unit when the image capturing unit is located at a first position in the optical axis direction, and the second image being captured by the sensor unit when the image capturing unit is located at a second position spaced farther away from the subject than the first position in the optical axis direction; and
    a determining unit that determines that a contamination is deposited on the optical transmission member when a difference in the number of pixels in which a contamination is detected between the first image and the second image is less than a first threshold.

2. The image capturing device according to claim 1, wherein the determining unit compares a pixel of the first image with a pixel of the second image that are located at an identical pixel position and, when the number of pixels in which a contamination is detected from either only one of the first image and the second image is less than the first threshold, determines that a contamination is deposited on the optical transmission member.

3. The image capturing device according to claim 1, wherein the detector divides each of the first image and the second image into a plurality of blocks, detects a contamination in pixels in each block, and determines a block to be a contaminated block when the block has the number of pixels in which a contamination is detected being more than a second threshold.

4. The image capturing device according to claim 1, further comprising:
    a storage, wherein
        the determining unit, when determining that a contamination is deposited on the optical transmission member, stores position information of a pixel corresponding to a position of the contamination on the optical transmission member in the storage.

5. The image capturing device according to claim 3, further comprising:
    a storage, wherein
        the determining unit, when determining that a contamination is deposited on the optical transmission member, stores position information of a contaminated block corresponding to a position of the contamination on the optical transmission member in the storage.

6. The image capturing device according to claim 4, further comprising:
    a controller that controls a color measurement for calculating a colorimetric value of the subject using an image of the subject as a color measurement target captured by the sensor unit, wherein
        the controller controls such that the position of the pixel in the image of the subject, which corresponds to the position of the contamination on the optical transmission member, is not to be used for the color measurement.

7. The image capturing device according to claim 5, further comprising:
    a controller that controls a color measurement for calculating a colorimetric value of the subject using an image of the subject as a color measurement target captured by the sensor unit, wherein
        the controller controls such that the position of the contaminated block in the image of the subject, which corresponds to the position of the contamination on the optical transmission member, is not to be used for the color measurement.

8. The image capturing device according to claim 1, further comprising:
    a first annunciator that provides a user with information prompting replacement or cleaning of the optical transmission member when the determining unit determines that a contamination is deposited on the optical transmission member.

9. The image capturing device according to claim 1, wherein the optical transmission member is removable from the image capturing unit.

10. The image capturing device according to claim 4, further comprising:
    a resetter that resets the position information of the pixel corresponding to the position of the contamination on the optical transmission member stored in the storage when the optical transmission member is replaced with a new one or cleaned.

11. The image capturing device according to claim 5, further comprising:
    a resetter that resets the position information of the contaminated block corresponding to the position of the contamination on the optical transmission member stored in the storage when the optical transmission member is replaced with a new one or cleaned.

12. The image capturing device according to claim 1, wherein, when the difference in the number of pixels in which a contamination is detected between the first image and the second image is equal to or more than the first threshold, the determining unit determines that a contamination is deposited on the subject.

13. The image capturing device according to claim 12, further comprising:
a movement control unit that changes a relative position between the image capturing unit and the subject in a direction perpendicular to the optical axis direction when the determiner determines that a contamination is deposited on the subject, wherein
while the relative position between the image capturing unit and the subject is being changed with the movement control unit, a detection of a contamination by the detector and a determination by the determining unit are repeatedly performed until the determining unit no longer determines that a contamination is deposited on the subject.

14. The image capturing device according to claim 1, further comprising:
a spatial matrix calculator that performs an edge emphasis processing on the first image and the second image using a spatial matrix, wherein
the detector detects a contamination in pixels from the first image and the second image that have undergone the edge emphasis processing.

15. The image capturing device according to claim 1, wherein the detector detects, as a contaminated pixel in the first image, a pixel in the first image whose pixel value has a difference from an average value of pixel values in the entire first image being equal to or more than a third threshold, and detects, as a contaminated pixel in the second image, a pixel in the second image whose pixel value has a difference from an average value of pixel values in the entire second image being equal to or more than the third threshold.

16. The image capturing device according to claim 1, wherein the first threshold is determined according to the number of pixels in which a contamination has been detected by the detector.

17. A color measuring device comprising:
an image capturing unit that includes:
an optical transmission member disposed on a surface facing a subject; and
a sensor unit that captures an image of the subject via the optical transmission member;
a moving unit that moves the image capturing unit in an optical axis direction of the sensor unit;
a detector that detects a contamination from both of a first image and a second image, the first image being captured by the sensor unit when the image capturing unit is located at a first position in the optical axis direction, and the second image being captured by the sensor unit when the image capturing unit is located at a second position spaced farther away from the subject than the first position in the optical axis direction;
a determining unit that determines that a contamination is deposited on the optical transmission member when a difference in the number of pixels in which a contamination is detected between the first image and the second image is less than a first threshold; and
a calculator that calculates a colorimetric value of the subject based on the image of the subject captured by the image capturing unit.

18. A color measuring system comprising:
an image capturing unit that includes:
an optical transmission member disposed on a surface facing a subject; and
a sensor unit that captures an image of the subject via the optical transmission member;
a moving unit that moves the image capturing unit in an optical axis direction of the sensor unit;
a detector that detects a contamination from both of a first image and a second image, the first image being captured by the sensor unit when the image capturing unit is located at a first position in the optical axis direction, and the second image being captured by the sensor unit when the image capturing unit is located at a second position spaced farther away from the subject than the first position in the optical axis direction;
a determining unit that determines that a contamination is deposited on the optical transmission member when a difference in the number of pixels in which a contamination is detected between the first image and the second image is less than a first threshold;
a calculator that calculates a colorimetric value of the subject based on the image of the subject captured by the image capturing unit; and
a communication unit that connects the image capturing unit and the calculator.

19. An image forming apparatus comprising:
an image output unit that outputs an image of a color measurement target to a recording medium; and
a color measuring unit that calculates a colorimetric value of the image, wherein
the color measuring unit is the color measuring device according to claim 17.

* * * * *